US010628185B1

(12) United States Patent
Gupta et al.

(10) Patent No.: US 10,628,185 B1
(45) Date of Patent: Apr. 21, 2020

(54) CONTENT-ADAPTIVE GUIDED TUTORIAL GENERATION

(71) Applicant: Adobe Inc., San Jose, CA (US)

(72) Inventors: Subham Gupta, Roorkee (IN); Ashutosh Dwivedi, Kadubeesanahalli (IN); Arnab Sil, Hooghly (IN); Anuradha, Bengaluru (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/271,403

(22) Filed: Feb. 8, 2019

(51) Int. Cl.
*G06F 3/00* (2006.01)
*G06F 9/451* (2018.01)
(Continued)

(52) U.S. Cl.
CPC ............ *G06F 9/453* (2018.02); *G06F 3/0481* (2013.01); *G06F 3/04847* (2013.01)

(58) Field of Classification Search
CPC .... G06F 30/00; G06F 3/0482; G06F 3/04842; G06F 30/20; G06F 30/23; G06F 3/011; G06F 3/04817; G06F 9/451; G06F 16/60; G06F 17/175; G06F 2111/10; G06F 2111/20; G06F 30/15; G06F 3/0484; G06F 40/169; G06F 16/13; G06F 16/2379; G06F 16/27; G06F 16/4393; G06F 16/5838; G06F 16/951; G06F 21/6227; G06F 3/017; G06F 3/0483; G06F 3/04845; G06F 3/04883; G06F 3/1454; G06F 9/445; G06F 9/453; G06F 11/3058; G06F 11/3089; G06F 11/328; G06F 16/00; G06F 16/148; G06F 16/185; G06F 16/23; G06F 16/24575; G06F 16/248; G06F 16/258; G06F 16/29; G06F 16/3329; G06F 16/338; G06F 16/40; G06F 16/438; G06F 16/447; G06F 16/51; G06F 16/53; G06F 16/56; G06F 16/5854; G06F 16/68; G06F 16/685; G06F 16/9535; G06F 16/9536; G06F 16/954; G06F 17/10;
(Continued)

(56) References Cited

U.S. PATENT DOCUMENTS

| 10,175,999 B2 * | 1/2019 | Jemiolo | .............. G06F 16/7837 |
| 2007/0015118 A1 * | 1/2007 | Nickell | .................... G09B 5/02 434/118 |
| 2013/0100159 A1 * | 4/2013 | Fernquist | .............. G06T 11/203 345/619 |

* cited by examiner

*Primary Examiner* — Di Xiao
(74) *Attorney, Agent, or Firm* — SBMC

(57) ABSTRACT

In implementations of content-adaptive guided tutorial generation, a computing device implements a guided tutorial generation module of an image-editing application that generates a content-adaptive guided tutorial based on input content. The content-adaptive guided tutorial provides instructions on how to interact with image-editing controls of the image-editing application, where the editing controls are selectable to initiate modifications to input parameters of the input content. The guided tutorial generation module receives the input content, and creates copy content that replicates content parameters of the input content as modifiable content parameters. The guided tutorial generation module can compute adjustment values for the modifiable content parameters that are selectable to initiate alterations to the copy content, and generates the content-adaptive guided tutorial to indicate how to interact with the editing controls to alter the content parameters based on the adjustment values to produce altered output content.

20 Claims, 15 Drawing Sheets
(7 of 15 Drawing Sheet(s) Filed in Color)

(51) Int. Cl.
*G06F 3/0481* (2013.01)
*G06F 3/0484* (2013.01)

(58) Field of Classification Search
CPC .... G06F 1/163; G06F 1/1637; G06F 2113/12; G06F 2119/18; G06F 21/31; G06F 21/53; G06F 21/56; G06F 21/563; G06F 21/565; G06F 21/60; G06F 21/602; G06F 21/606; G06F 21/6254; G06F 21/64; G06F 21/78; G06F 2221/2115; G06F 30/367; G06F 30/398; G06F 3/012; G06F 3/013; G06F 3/023; G06F 3/03545; G06F 3/048; G06F 3/04847; G06F 3/0485; G06F 3/04886; G06F 3/06; G06F 3/0605; G06F 3/0622; G06F 3/0643; G06F 3/067; G06F 3/147; G06F 3/167; G06F 40/106; G06F 40/109; G06F 40/134; G06F 40/166; G06F 40/186; G06F 40/20; G06F 40/205; G06F 40/216; G06F 40/274; G06F 40/284; G06F 40/30; G06F 7/08; G06F 8/30; G06F 8/31; G06F 8/33; G06F 8/34; G06F 8/38; G06F 9/30036; G06F 9/3887; G06F 9/5016; G06F 9/542
See application file for complete search history.

CONTENT-ADAPTIVE GUIDED TUTORIAL GENERATION

BACKGROUND

Image-editing computer applications with many image-editing features can be difficult for a new user to learn and use to make edits and enhancements to digital photos, for example. Tutorials may be included or built into an image-editing application and provide guidance to the user on how to access and use features of the application, such as through the use of a searchable help file. By searching the help file, the user can obtain instructions on how to find, navigate, and use particular functionality of the application. However, if a novice user is unaware of what functionality the application includes, locating a solution to a problem by searching the help file may be difficult for the user, or may yield unfavorable results. Users can alternatively turn to online resources to locate guidance about how to use and work with an application, but similar challenges exist if the user is unaware of what functionality the application provides.

Additionally, simply watching tutorials that provide guidance can also pose challenges for a user seeking to learn how to use an image-editing application. For example, a tutorial can provide instructions on how to access application features by using a fixed problem with a fixed solution, such as an image-editing tutorial that presents instructions on how to use image-editing controls with a preselected image and predetermined correction values that are built into the application tutorial. While this type of pre-edited, built in tutorial delivers instructions to the user, the predetermined correction values may not work on a user's personal image. Thus, the user must first understand the aspects of the image-editing features shown in the tutorial, and then translate the teachings as applied to personal assets, such as a digital photo that the user may want to enhance using the application. This multiple-step process may frustrate the user, leading to a poor user experience with the image-editing application, notably when the user has trouble applying the teachings of the tutorial to the personal assets of the user, or when the teachings of the tutorial fail to adequately address questions or concerns that the user may encounter with fixed problem, fixed solution tutorials.

SUMMARY

This Summary introduces features and concepts of content-adaptive guided tutorial generation, which is further described below in the Detailed Description and shown in the Figures. This Summary should not be considered to describe essential features of the claimed subject matter, nor used to determine or limit the scope of the claimed subject matter.

Aspects of content-adaptive guided tutorial generation are described. In implementations, a computing device implements an image-editing application that includes image-editing controls, which are selectable to initiate modifications to image parameters of an input image. The image-editing application also includes a guided tutorial generation module that can generate a content-adaptive guided tutorial based on the input image, where the content-adaptive guided tutorial indicates how to interact with the image-editing controls of the image-editing application to produce a visually altered output image. For example, the guided tutorial generation module receives the input image as an input, and creates a rendition image from the input image, where the rendition image replicates the image parameters of the input image as modifiable image parameters of the rendition image. The guided tutorial generation module can then compute adjustment values for the modifiable image parameters based on an image analysis of the rendition image, such as by applying image processing or machine-learning algorithms to the rendition image to determine the adjustment values, which provide visual alterations to the rendition image. The guided tutorial generation module can generate the content-adaptive guided tutorial to indicate how to interact with the image-editing controls to change the image parameters based on the adjustment values and produce a visually altered output image of the rendition image.

In other aspects of content-adaptive guided tutorials, an image-editing control can be excluded from the content-adaptive guided tutorial. The guided tutorial generation module can analyze the adjustment values for the modifiable image parameters to determine an adjustment value that is visually non-productive. For example, the guided tutorial generation module can compute a difference between an adjustment value and an image parameter of the modifiable image parameters, and compare the difference to a threshold value to determine that the adjustment value is visually non-productive, such as if the difference being lower than the threshold value. The guided tutorial generation module can then identify the image-editing controls that are associated with the visually non-productive adjustment value, and exclude these image-editing controls from the content-adaptive guided tutorial. In implementations, a markup-language template of instructions that indicate how to render the content-adaptive guided tutorial is modified to exclude instructions that would otherwise indicate how to interact with the image-editing controls associated with the adjustment value that is determined as being visually non-productive.

In implementations, the content-adaptive guided tutorial can generate the content-adaptive guided tutorial with a presentation order for the image-editing controls based on a prioritization of the adjustment values. For example, the guided tutorial generation module can compute an overall aesthetic score of the visually altered output image that is based on the adjustment values having been applied to the modifiable image parameters of the rendition image. The guided tutorial generation module can also determine a respective contribution of each of the adjustment values to the overall aesthetic score, and determine an adjustment value order that places higher contributing adjustment values before lower contributing adjustment values. The image-editing controls can then be positioned in the content-adaptive guided tutorial to correspond with the adjustment value order based on the adjustment values that correspond to the image-editing controls.

In other aspects of content-adaptive guided tutorial generation, the content-adaptive guided tutorial can determine a quality level and/or an effectiveness of the content-adaptive guided tutorial. For example, the content-adaptive guided tutorial can determine a rendition aesthetic score of the rendition image prior to the adjustment values being applied to the corresponding modifiable image parameters of the rendition image, and an overall aesthetic score of the visually altered output image can be determined based on the adjustment values having been applied to the corresponding modifiable image parameters. The content-adaptive guided tutorial can then determine the quality level of the content-adaptive guided tutorial based on a comparison of the rendition aesthetic score and the overall aesthetic score.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Implementations of content-adaptive guided tutorials are described with reference to the following Figures. The same numbers may be used throughout to reference similar features and components that are shown in the Figures.

DETAILED DESCRIPTION

Figure 1:
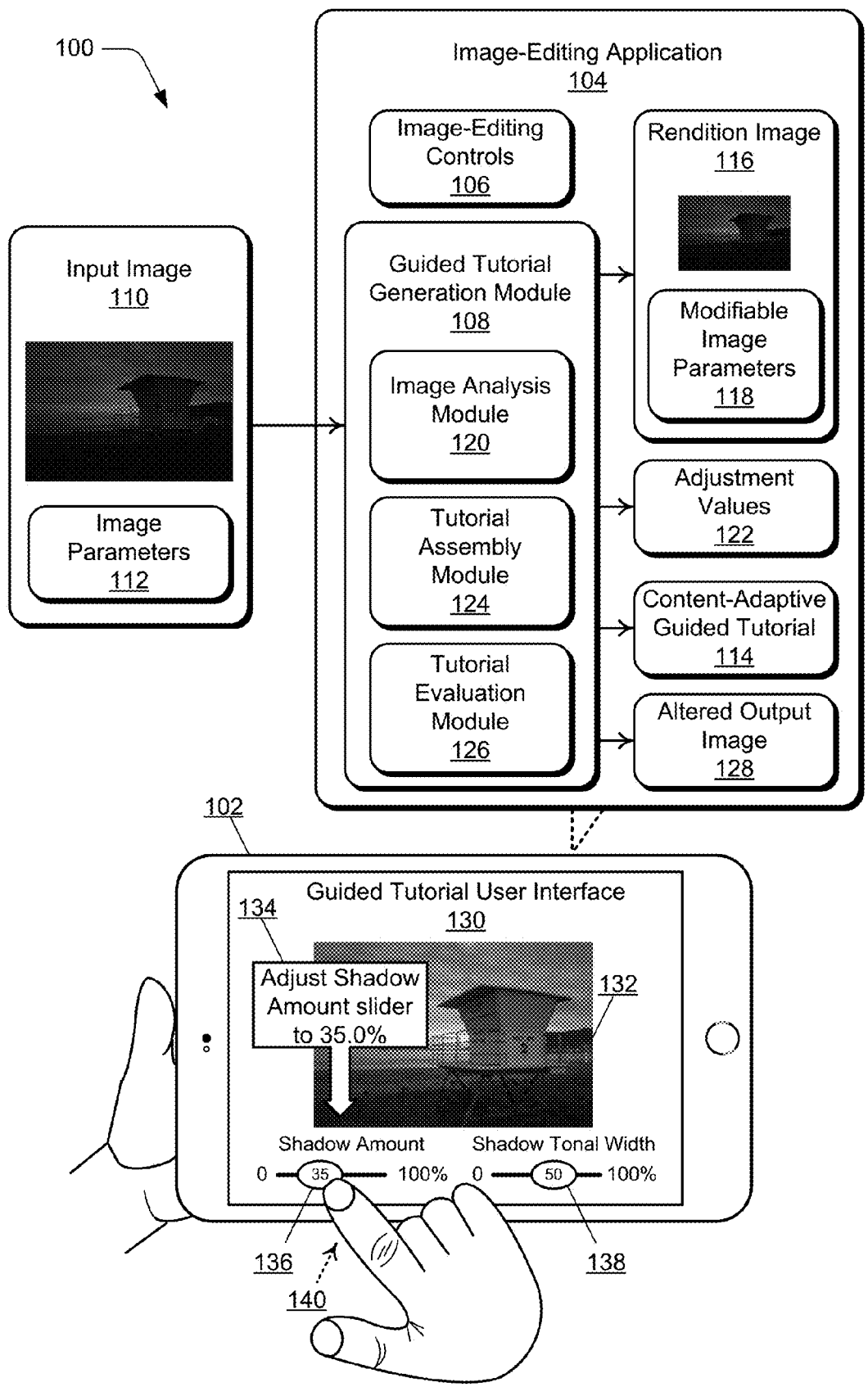
FIG. 1 illustrates an example environment in which aspects of content-adaptive guided tutorial generation can be implemented.

Implementations of content-adaptive guided tutorial generation are described, and provide a system for the dynamic generation of a guided tutorial based on input content, such as a guided tutorial for an image-editing application that is generated for a user based on an input image provided by the user. Generally, content-adaptive guided tutorial generation refers to dynamically determining tutorial instructions to include in a guided tutorial based on an analysis of input content, such as a digital image, video content, or other type of input content. A guided tutorial refers to a tutorial that interfaces with an application, such as an image-editing application that includes editing features, which are exposed and accessible through the guided tutorial. A guided tutorial generation module can be implemented as a component of an image-editing application (or other content-editing application) to analyze the input content and identify enhancements, providing step-by-step instructions on how to apply the enhancements in a guided tutorial. For example, the guided tutorial generation module can analyze an input image to identify visual flaws, determine adjustment values that correct the visual flaws, and generate a content-adaptive guided tutorial that instructs a user how to apply the adjustment values through the use of image-editing controls to produce visual alterations and improve to the input image.

In implementations, the guided tutorial generation module can identify adjustment values and corresponding image-editing controls to exclude from a content-adaptive guided tutorial, such as adjustment values that are determined to be visually non-productive. For example, an adjustment value can be identified as being visually non-productive by evaluating an amount of change that the adjustment value produces in the input image when applied through the corresponding image-editing controls. When the amount of change fails to visually alter the input image within a threshold value, the adjustment value is identified as being visually non-productive, and can be excluded from the guided tutorial. Conversely, when the amount of change meets or exceeds the threshold value, the adjustment value is identified as being visually productive, and is included in the guided tutorial. The guided tutorial generation module can generate the content-adaptive guided tutorial, excluding the instructions for the visually non-productive adjustment values and corresponding image-editing controls, and including the instructions for the visually productive adjustment values and corresponding image-editing controls.

This effectively selects a subset of the image-editing controls of an image-editing application on which to base generating the content-adaptive guided tutorial. The inclusion of visually productive adjustment values and corresponding image-editing controls, as well as the exclusion of visually non-productive adjustment values and corresponding image-editing controls, produces a content-adaptive guided tutorial that recommends content-specific techniques based on the input image. This improves the efficiency of how the generated content-adaptive guided tutorial presents information by providing viewers access to instructions relevant to identified flaws in the user's own content image, and removing unrelated instructions. This also expedites the user's access to image-editing controls that can be used to correct the user's content image, and provides an efficient use of computer processing time by removing unwanted instructions and freeing up processing resources.

In implementations, the guided tutorial generation module of an image-editing application can create a rendition image from an input image, where the rendition image replicates a current state of the input image, such as by replicating image parameters of the input image as modifiable image parameters of the rendition image. Aspects of content-adaptive guided tutorial generation produce a modified version of the input image that maintains a level of image quality but includes less data relative to the input image. This can include determining a smaller image size for the rendition image relative to the input image based on the available processing power of a computing device that implements the image-editing application. The guided tutorial generation module can analyze the rendition image to generate adjustment values and identify corresponding image-editing controls from which a content-adaptive guided tutorial is generated.

The guided tutorial generation module analyzes the rendition image, in lieu of the input image, which improves the image analysis computation times by reducing a number of points being analyzed, while maintaining the level of quality. This also speeds up the generation of the content-adaptive guided tutorial and improves an overall efficiency of the computing device that implements the guided tutorial generation module. Presentation of the content-adaptive guided tutorial can be integrated with an editing application such that presentation of the content-adaptive guided tutorial interfaces with the editing controls of the editing application to enable a user editing the input image. Thus, generating and analyzing copy content (e.g., the rendition image) improves the speed of analyses used to identify adjustment values, as well as the generation of the corresponding content-adaptive guided tutorial. In implementations, the content-adaptive guided tutorial, when presented, interacts with the input content, rather than the copy content, such that output content from the tutorial is based on the input content. Alternatively, or in addition, the content-adaptive guided tutorial, when presented, can interact with the copy content.

The guided tutorial generation module described herein can determine which instructions to include in a content-adaptive guided tutorial based on identified flaws in an input image, and can determine which improvements can be applied to correct the identified flaws. Adjustment values for the modifiable image parameters of the rendition image can be identified by applying image processing algorithms, machine-learning algorithms, or any combination thereof to the rendition image. The adjustment values can be applicable to any suitable type of image parameter, such as luma adjustment values, red-green-blue (RGB) adjustment values, blur adjustment values, contrast adjustment values, tint adjustment values, saturation adjustment values, exposure adjustment values, and many other types of adjustment values. Image processing and machine-learning algorithms can separately or jointly analyze the rendition image to identify visual flaws specific to the rendition image (e.g., blurry, dark shadows, overexposed areas, underexposed areas, lack of contrast, etc.), and generate adjustment values directed to improving the visual flaws specific to the rendition image. This differs from conventional tutorials that use precalculated adjustment values on preselected images, such as with "built-in" static tutorials that may come with an image-editing application. The adjustment values generated by the guided tutorial generation module are based on an analysis of the rendition image and provide specific image quality level improvements to the rendition image. Conversely, precalculated adjustment values from a preselected image that are applied to the rendition image may not address the visual problems specific to the rendition image and can result in making the output image quality level worse instead of better.

In implementations of content-adaptive guided tutorial generation, the guided tutorial generation module can optionally prioritize how information is presented in the content-adaptive guided tutorial. Each adjustment value can be evaluated to determine a contribution of the adjustment value to an overall aesthetic score of content generated by the content-adaptive guided tutorial (e.g., output content generated by applying adjustment values to the corresponding content parameters). Adjustment values and corresponding application editing controls that provide a higher contribution to the overall aesthetic score can be positioned earlier in the content-adaptive guided tutorial relative to adjustment values and corresponding application editing controls that have a lower contribution to the overall aesthetic score. For example, the adjustment values that provide a higher contribution to improving an aesthetic quality level of a rendition image can be prioritized and displayed earlier in the content-adaptive guided tutorial relative to the adjustment values with less contribution to the aesthetic quality level. This can improve the efficiency of how the content-adaptive guided tutorial presents information by providing step-by-step instructions and adjustment values that achieve a higher quality level output more quickly. This prioritization allows a user to modify an input image and achieve higher quality level results more quickly, lending to an improved user experience.

In other aspects of content-adaptive guided tutorial generation, a quality level of the content-adaptive guided tutorial can be computed and analyzed by the guided tutorial generation module. For example, an overall aesthetic score of the output content generated by the content-adaptive guided tutorial can be computed. The overall aesthetic score can then be compared to a pre-adjustment aesthetic score of the content (e.g., an aesthetic score computed on the content before the adjustment values have been applied). This includes generating an aesthetic score for a rendition image before adjustment values have been applied (e.g., a rendition aesthetic score) and an aesthetic score after the adjustment values have been applied (e.g., an overall aesthetic score). A comparison of the overall aesthetic score to the pre-adjustment aesthetic score provides an indication of a quality level of the content-adaptive guided tutorial based on an improvement the guided tutorial provides. When the content improvement is less than a threshold value, the guided tutorial generation module can determine to generate different adjustment values and/or identify different instructions to include in the content-adaptive guided tutorial effective to improve the quality level of the output content, which improves the quality level of the content-adaptive guided tutorial.

In a quality evaluation of the content-adaptive guided tutorial, the guided tutorial generation module can also analyze how many steps are included to achieve the output content, where fewer steps to achieve a same output quality level of the content is determined to be a higher quality tutorial. Thus, a quality evaluation of the content-adaptive guided tutorial generates a higher quality level of output content relative to unevaluated tutorials, such as the conventional tutorials that use predetermined adjustment values which may or may not address the flaws of an input image or other input content from a user. The quality evaluation of the content-adaptive guided tutorial also improves the efficiency of a computing device by identifying combinations of adjustment values and editing controls that achieve an output quality level with fewer steps, thus freeing up processing resources of the computing device.

While features and concepts of content-adaptive guided tutorial generation can be implemented in any number of different devices, systems, networks, environments, and/or configurations, implementations of content-adaptive guided tutorial generation are described in the context of the following example devices, systems, and methods.

FIG. 1 illustrates an example environment 100 in which aspects of content-adaptive guided tutorial generation can be implemented. The example environment 100 includes a computing device 102, which implements an image-editing application 104 that includes image-editing controls 106 and a guided tutorial generation module 108 designed to generate content-adaptive guided tutorials, as further described herein. The computing device 102 can be implemented as any type of computing device, client device, mobile phone, tablet device, communication, entertainment, gaming, media playback, and/or other type of electronic and/or computing device. In this example environment 100, the computing device 102 may include any number and combination of different components as shown and described with reference to the example device shown in FIG. 15.

The computing device 102 implements the image-editing application 104 and the guided tutorial generation module 108, such as in software, in hardware, or as a combination of software and hardware components. In this example, the image-editing application 104 and the guided tutorial generation module 108 are implemented as software applications or modules, such as executable software instructions (e.g., computer-executable instructions) that are executable with a processing system of the computing device 102 to implement the techniques of content-adaptive guided tutorial generation. The image-editing application 104 and the guided tutorial generation module 108 can be stored on computer-readable storage media, such as any suitable memory device or electronic data storage implemented in the computing device 102. Further, although the guided tutorial generation module 108 is described and illustrated as being a component of the image-editing application 104, the guided tutorial generation module 108 may be implemented as a separate, individual module of the computing device. Alternatively or in addition, the guided tutorial generation module 108 may include independent processing, memory, and logic components functioning as a computing and/or electronic device integrated with the computing device.

The image-editing application 104 includes the image-editing controls 106 that represent selectable controls, which provide access to functionality of the image-editing application, such as functionality that can modify properties of a digital image. For example, an input image 110 can be input as a digital image to the image-editing application 104 via the image-editing controls 106. Generally, the input image 110 represents any suitable type of input content to the image-editing application 104, such as a user image or other asset, a stock image, a downloaded image, and so forth. The input image 110 may also be input in any suitable format (e.g., Tagged Image File Format (TIFF), Joint Photographic Experts Group (JPEG), Graphic Interchange Format (GIF), Portable Network Graphics (PNG), Photoshop Document (PSD), Encapsulated PostScript (EPS), etc.). The input image 110 includes image parameters 112 that characterize a current state of various image characteristics of the input image 110, such as contrast, brightness, an angle of rotation, image scaling, image cropping, image blurring, image sharpening, color depth, brightness, Gamma correction, and any other type of image parameters. In implementations, the image parameters 112 can be accessed and changed through the use of the image-editing controls 106 effective to produce a visual modification to the input image 110. In this example, the guided tutorial generation module 108 of the image-editing application 104 receives the input image 110 as input content, and bases the generation of a content-adaptive guided tutorial 114 on the input image 110.

In implementations, the guided tutorial generation module 108 generates a rendition image 116 from the input image 110, and the rendition image 116 includes modifiable image parameters 118 that replicate a current state of the image parameters 112 of the input image 110. The rendition image 116 can be an copy of the input image 110 that replicates an image size and an image quality level, or the rendition image 116 may be a modified version with a reduced size and a reduced image quality level.

The guided tutorial generation module 108 includes an image analysis module 120 that can receive the rendition image 116 and generate adjustment values 122 that represent visual enhancements to the rendition image 116. In implementations, the image analysis module 120 can identify visual flaws in the rendition image 116 and editing modifications that can then be used to correct the visual flaws, such as through the use of image processing algorithms, machine-learning algorithms, or any combination thereof. For example, contrast correction algorithms based on histogram equalization, gamma correction, etc. can be used to generate a contrast adjustment value; image restoration algorithms can be used to generate blur adjustment values and/or sharpness adjustment values; neural network algorithms can be used to generate shadow adjustment values; etc. The adjustment values 122 represent the editing modifications, or adjustments, that can be applied to one or more of the modifiable image parameters 118 through the use of the image-editing controls 106. The adjustment values 122 calculated by the image processing algorithms and/or the machine-learning algorithms can correspond to all of the image-editing controls 106, or a subset of the image-editing controls 106 such that the content-adaptive guided tutorial 114 includes a subset of instructions corresponding to the image-editing controls 106.

The guided tutorial generation module 108 also includes a tutorial assembly module 124 and a tutorial evaluation module 126 that work together to generate a content-adaptive guided tutorial 114. An image-editing guided tutorial is an example of a content-adaptive guided tutorial that can be generated, and includes instructions on how to access the image-editing controls 106 and apply the adjustment values 122 to the modifiable image parameters 118 of the rendition image 116. In implementations, the tutorial assembly module 124 can modify a template that describes rendering instructions for a tutorial to include the adjustment values 122. The tutorial evaluation module 126 can determine when one of the adjustment values 122 is visually non-productive and direct the tutorial assembly module 124 to exclude corresponding image-editing controls from the image-editing guided tutorial.

For example, for each of the adjustment values 122, the tutorial evaluation module 126 can compute a difference between the adjustment value and a corresponding image parameter, and compare the difference to a threshold value to identify when the adjustment value is visually non-productive (e.g., fails to provide visual alterations to the rendition image 116 within a threshold value). The tutorial evaluation module 126 can then notify the tutorial assembly module 124 of the visually non-productive adjustment value. In implementations, the tutorial assembly module 124 can modify the template to exclude instructions from the image-editing guided tutorial that would otherwise indicate how to interact with the image-editing controls 106 that are associated with the visually non-productive adjustment parameter.

In implementations, the tutorial evaluation module 126 can determine a presentation order for the image-editing controls 106 in the generated content-adaptive guided tutorial 114 based on how the adjustment values 122 contribute to an overall aesthetic score of output content generated through use of the guided tutorial, such as an altered output image 128. The tutorial assembly module 124 receives a notification of the presentation order, and positions the instructions corresponding to the image-editing controls 106 based on the presentation order, such as by modifying the template.

The altered output image 128 represents output content generated by following the order of the instructions included in the content-adaptive guided tutorial 114, such as an image-editing guided tutorial and applying the adjustment values 122 to the modifiable image parameters 118 of the rendition image 116. In implementations, the tutorial evaluation module 126 can determine a quality level of the image-editing guided tutorial by computing an overall aesthetic score of the altered output image 128 and comparing the overall aesthetic score to an aesthetic score of the rendition image 116, such as by calculating a difference between the two aesthetic scores and comparing the difference to a threshold value. The tutorial evaluation module 126 can then determine to increase the quality level of the image-editing guided tutorial based on the comparison and regenerate the adjustment values 122. In implementations, a different subset or combination of the image-editing controls 106 may be determined as well. To improve the quality level, a modified image-editing guided tutorial can be generated using the regenerated adjustment values and/or a different subset of the image-editing controls.

A content-adaptive guided tutorial 114, such as an image-editing guided tutorial in this example, provides instructions on how a user can interact with content editing controls, such as the image editing controls 106 of the image-editing application 104. In this example, an image-editing guided tutorial has access to the image-editing controls 106 and the rendition image 116 such that, during presentation of the content-adaptive guided tutorial 114, the rendition image 116 is modified to produce the altered output image 128. In implementations, the generation of the image-editing guided tutorial is based on an analysis of the rendition image 116 to identify the adjustment values 122 and the image-editing controls 106 to include in the guided tutorial, but the presentation of the guided tutorial modifies the image parameters 112 of the input image 110.

In the example environment 100, the computing device 102 displays a guided tutorial user interface 130 through which a content-adaptive guided tutorial 114 can be displayed. The guided tutorial user interface 130 displays an edited image 132 that corresponds to a version of the rendition image 116 or input image 110 that has had at least some of the adjustment values 122 applied to the image parameters of the image. Thus, the edited image 132 represents a visually enhanced version of the rendition image 116 and/or the input image 110.

The guided tutorial user interface 130 also displays guidance 134 that provides instructions on how a user can interact with the image-editing controls 106 of the image-editing application 104. For example, the guidance 134 identifies a particular image-editing control (e.g., a "Shadow Amount" slide control) and a particular adjustment value to apply (e.g., "35%"). The guided tutorial user interface 130 also includes access to the various image-editing controls 106. In this example, the guided tutorial user interface 130 includes an image-editing control 136 and another image-editing control 138, where the guidance 134 provides instructions on how the user can locate the image-editing control 136 in the form of an arrow pointing towards the image-editing control 136. Other implementations can include text-based instructions, audible-instructions, animated instructions, video instructions, menu navigation instructions, and so forth, as part of the guidance 134. A user can respond to the guidance 134 in the form of a touch input 140 on the touch screen of the computing device 102. Although the guided tutorial generation module 108 in the example environment 100 is described as generating a content-adaptive guided tutorial 114 for the image-editing application 104, the guided tutorial generation module 108 can generate content-adaptive guided tutorials for other types of applications as well, such as an audio-editing application, a video-editing application, a text editing application, a publishing application, and so forth.

Figure 2:
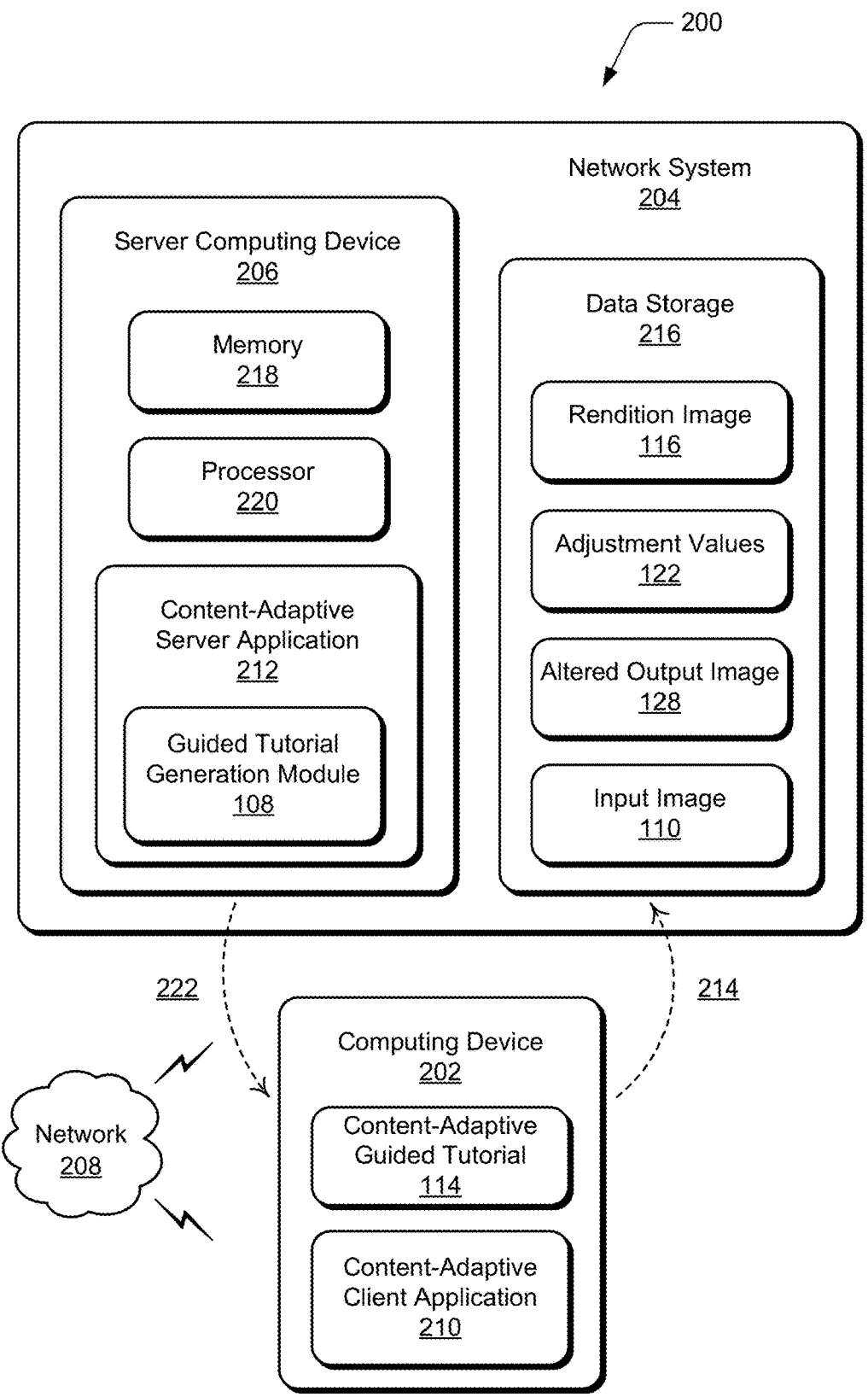
FIG. 2 illustrates another example environment in which aspects of content-adaptive guided tutorial generation can be implemented.

FIG. 2 illustrates an example environment 200 in which aspects of content-adapted guided tutorial generation can be implemented. The example environment 200 includes a computing device 202 and a network system 204, which implements features of the guided tutorial generation module 108, as shown and described with reference to FIG. 1. The computing device 202 can be implemented as any type of computing device described herein, such as the computing device 102 shown and described with reference to FIG. 1. In this example environment 200, the computing device 202 may include any number and combination of different components as shown and described with reference to the example device shown in FIG. 15, and is implemented to access and communicate with a server computing device 206 of the network system 204, such as via a communication network 208.

Any of the devices, servers, and/or services described herein can communicate via the network 208, such as for data communication between the computing device 202 and the network system 204. The network 208 can be implemented to include a wired and/or a wireless network. The network can also be implemented using any type of network topology and/or communication protocol, and can be represented or otherwise implemented as a combination of two or more networks, to include IP-based networks and/or the Internet. The network 208 may also include mobile operator networks that are managed by a mobile network operator and/or other network operators, such as a communication service provider, mobile phone provider, and/or Internet service provider.

In this example environment 200, the computing device 302 includes a content-adaptive client application 210 that corresponds to a client-side implementation of the image-editing application 104 shown and described with reference to FIG. 1. The content-adaptive client application 210 can communicate with a content-adaptive server application 212 at the server computing device 206 over the network 208, where the content-adaptive server application 212 corresponds to a server-side implementation of the image-editing application 104.

A user of the computing device 202 can upload the input image 110 to the network system 204 via the network 308, as indicated at 214, and the input image 110 may be stored in data storage 216 of the network system. The network system 204 can receive the uploaded input image 110 as input to the guided tutorial generation module 108 of the content-adaptive server application 212. In this example environment 200, the network system 204 is representative of any number of cloud-based access sites that provide a service and/or from which data and information is available, such as via the Internet, for on-line and/or network-based access. The network system 204 can be accessed on-line, and includes the server computing device 206, which is representative of one or more hardware server devices (e.g., computing devices) that may be implemented at the network system. The server computing device 206 includes memory 218 and a processor 220, and may include any number and combination of different components as shown and described with reference to the example device shown in FIG. 15.

The network system 204 may include multiple data storage, server devices, and applications, and can be implemented with various components as shown and described with reference to the example device shown in FIG. 15. The network system 204 includes the data storage 216 that may be implemented as any suitable memory, memory device, or electronic data storage for network-based data storage. The data storage 216 is utilized at the network system 204 to maintain the input image 110 as received from the computing device 202, the rendition image 116, the adjustment values 122, and/or the altered output image 128, as shown and described with reference to FIG. 1.

In this example environment 200, the server computing device 206 implements the guided tutorial generation module 108 and the content-adaptive server application 212, such as in software, in hardware, or as a combination of software and hardware components, generally as shown and described with reference to FIG. 1. In this example, the guided tutorial generation module 108 is implemented as a software application or modules, such as executable software instructions (e.g., computer-executable instructions) that are executable with a processing system (e.g., the processor 220) of the server computing device 206 to implement the techniques of content-adaptive guided tutorial generation. The guided tutorial generation module 108 and the content-adaptive server application 212 can be stored on computer-readable storage media, such as any suitable memory device (e.g., the device memory 218) or electronic data storage implemented in the server computing device 306 and/or at the network system 304.

A user of the computing device 202 can upload the input image 110 to the network system 204 via the network 308, as indicated at 214, and the input image 110 is an input to the guided tutorial generation module 108 of the content-adaptive server application 212. As described with reference to FIG. 1, the guided tutorial generation module 108 generates the rendition image 116 from the input image 110, and the rendition image 116 includes the modifiable image parameters 118 that replicate a current state of the image parameters 112 of the input image. The guided tutorial generation module 108 includes the image analysis module 120, which can receive the rendition image 116 and generate the adjustment values 122 that represent visual enhancements to the rendition image 116. The guided tutorial generation module 108 can then generate the content-adaptive guided tutorial 114, which includes instructions on how to access the image-editing controls 106 of the content-adaptive client application 210, and apply the adjustment values 122 to the modifiable image parameters 118 of the rendition image 116. The server computing device 206 can communicate the content-adaptive guided tutorial 114 from the network system 204 to the computing device 202 via the network 308, as indicated at 222, where the content-adaptive guided tutorial 114 can be display in the guided tutorial user interface 130.

Figure 3:
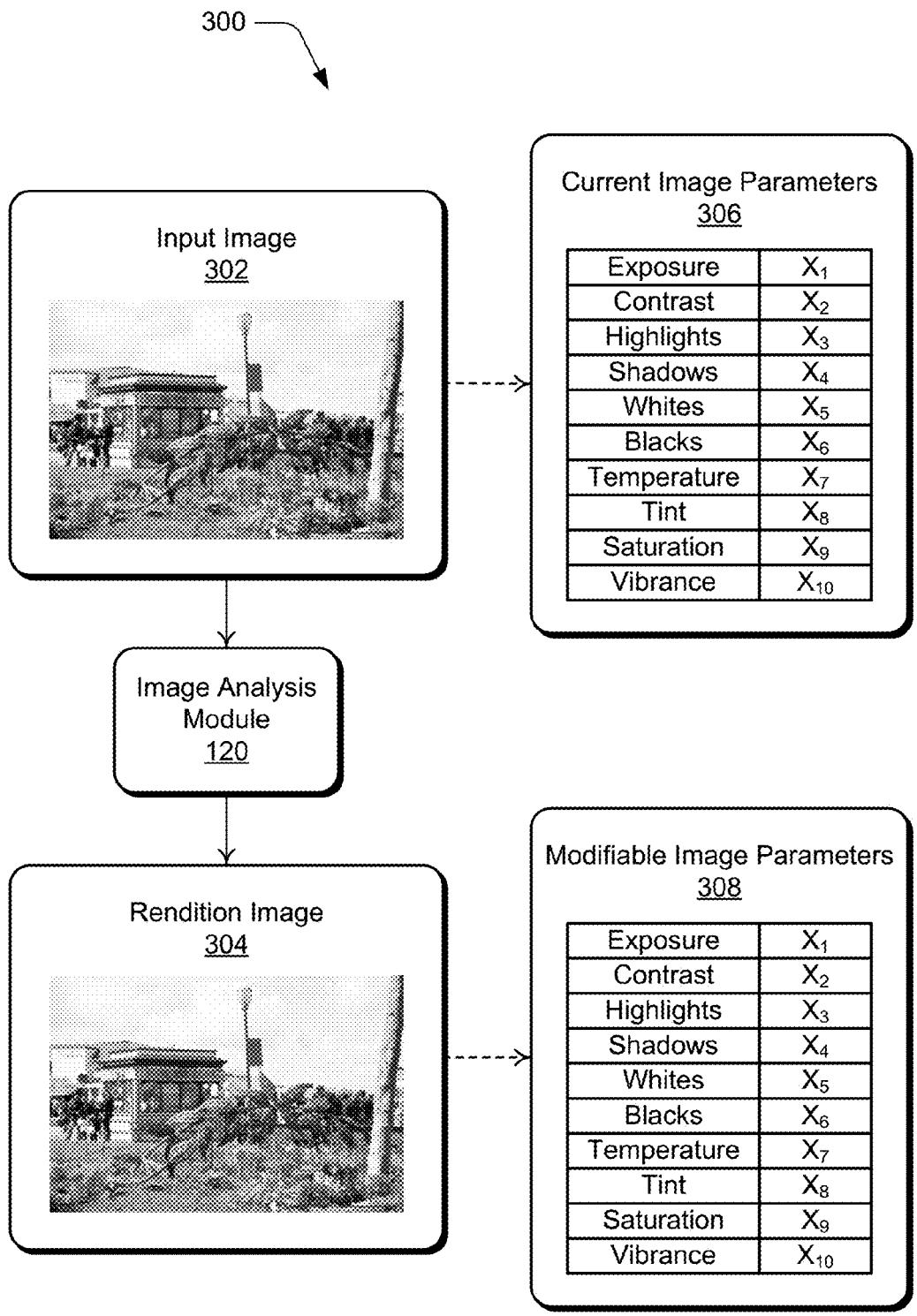
FIGS. 3-6 illustrate example features of content-adaptive guided tutorial generation in accordance with one or more implementations.

FIG. 3 illustrates example 300 of features of content-adaptive guided tutorial generation as described herein. The image analysis module 120 of the guided tutorial generation module 108, as shown and described with reference to FIG. 1, can be implemented by any of the computing devices described herein, such as the computing device 102, the computing device 202, and/or the server computing device 206. In aspects of content-adaptive guided tutorial generation, a content-adaptive guided tutorial 114 can be automatically initiated for generation without explicit user input directed towards generating the guided tutorial. In this example, the image analysis module 120 receives an input image 302 that generally represents any suitable type of digital image and generates a rendition image 304 that is used as a basis for generating the content-adaptive guided tutorial. As described herein, the input image 302 represents any suitable digital image, such as a personal image input by a user to the image-editing application 104 as shown and described with reference to FIGS. 1 and 2. In implementations, the generation of a content-adaptive guided tutorial 114 is initiated based on receiving the input image 302 and without explicit user input that initiates the generation of the guided tutorial.

The guided tutorial generation module 108 can generate the rendition image 304 by replicating a current image state of the input image 302 for the rendition image 304. Current image parameters 306 correspond to the current image state of the input image 302 and represent characteristics that can be manipulated to visually alter the input image 302. In this example, the value of each image parameter in the current image parameters 306 is denoted with the notation "$X_n$," to indicate that the values can be arbitrary numbers. Thus, the input image 302 may be in any image state (e.g., an original capture state, an edited state from the original capture state, etc.), and the current image parameters capture that image state.

The image analysis module 120 of the guided tutorial generation module 108 can receive the input image 302 as an input and generate the rendition image 304 that replicates the current image parameters 306, included in this example as modifiable image parameters 308. Since the rendition image 304 is a replica of the image state of the input image 302, the exposure parameter value of the current image parameters 306 is replicated for the exposure parameter value in the modifiable image parameters 308; the contrast parameter value of the current image parameters 306 is replicated for the contrast parameter value in the modifiable image parameters 308, and so forth for all of the image parameters.

In implementations, the image analysis module 120 of the guided tutorial generation module 108 generates the rendition image 304 as a modified version of the input image 302 based on characteristics of a computing device that is being used to generate a content-adaptive guided tutorial 114 as described herein. The image analysis module 120 can identify resource characteristics associated with the computing device, such as a processing power, available memory resources, etc., and select an image size and/or image quality level of the rendition image 304 based on these characteristics. For example, the image analysis module 120 can receive a high-resolution input image that has image dimensions of 3300×2550 pixels with an approximate file size of 32.1 Megabytes (Mb), and generate a rendition image with less resolution and/or a smaller file size (e.g., 1024×768 pixels with an approximate file size of 3 Mb) based on the available processing power and memory of the computing device. Thus, the image size and image quality level of the rendition image 304 as generated by the image analysis module 120 can be different from the input image 302, but maintain a same image state (e.g., the current image parameters). However, for a different computing device, the image analysis module 120 can generate a rendition image that maintains the original image dimensions and file size of the input image 302 based on the available resources of the different computing device.

In aspects of content-adaptive guided tutorial generation, an optimal size and resolution for a rendition image can be identified by balancing the file size and image resolution with an image quality level. An image quality level can be determined in any suitable manner, such as through a Perception based Image Quality Evaluator (PIQE), a Natural Image Quality Evaluator (NIQE), a Blind/Referenceless Image Quality Evaluator (BRISQUE), a Structural Similarity (SIMM) Index, a Peak Signal-to-Noise Ratio (pSNR), a Mean-Squared Error (MSE) measurement, and so forth. In implementations, the optimal size refers to a minimal image size or resolution that maintains an image quality level. For example, consider an input image that has an image resolution of 3264×2448 pixels. The image analysis module 120 can evaluate reduced resolution images (e.g., 2080×1542 pixels, 1600×1200 pixels, 640×480 pixels) and select the reduced size that maintains an image quality level with the least number of pixels. This selection process improves how the image analysis module 120, as well as other components of the guided tutorial generation module 108 as shown and described in FIG. 1, generates a content-adaptive guided tutorial 114 by using less data points and improving computation speed.

Figure 4:
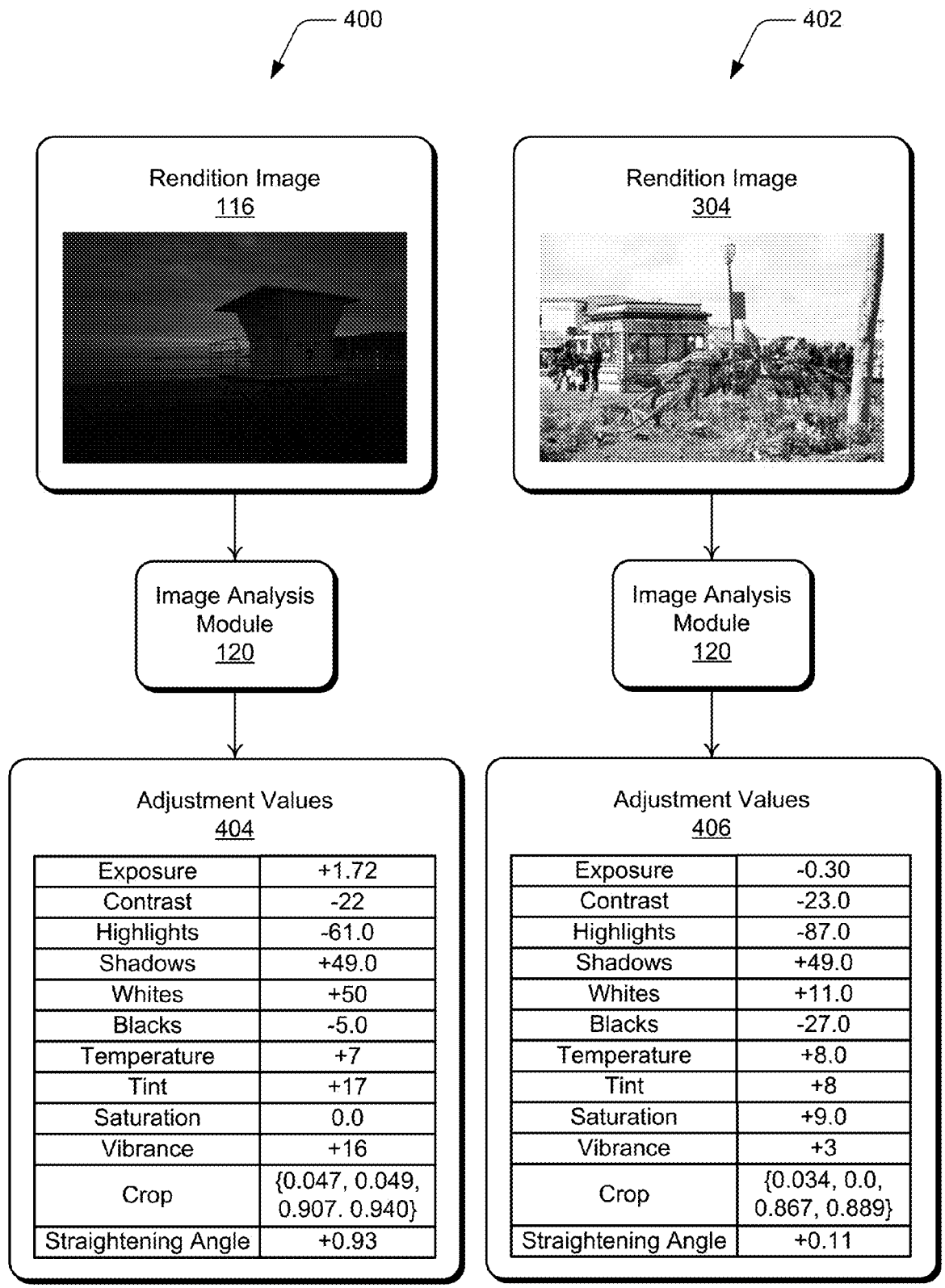

FIG. 4 further illustrates examples 400 and 402 of features of content-adaptive guided tutorial generation as described herein, and includes the image analysis module 120 of the guided tutorial generation module 108, as shown and described with reference to FIG. 1. In implementations, the image analysis module 120 is also implemented to analyze a rendition image to identify visual flaws and adjustment values that can be used to correct these visual flaws. In the example 400, the image analysis module 120 can analyze the rendition image 116 to identify visual flaws and adjustment values that can be used to correct or improve the visual flaws of the image. A visual flaw may be identified as an image parameter or characteristics that deviates from an ideal value for the digital image. For example, the rendition image 116, as unaltered, has an underexposed appearance with shadows and darkness that obscure details of the image. The image analysis module 120 can identify the underexposed visual flaw by using image processing algorithms, machine-learning algorithms, or any combination thereof, to obtain metrics that measure characteristics associated with an image being underexposed, such as an exposure metric, a brightness metric, a highlights metric, a shadows metric, a contrast metric, and so forth.

The image analysis module 120 can then compare the metrics to predetermined values that represent an ideal representation of the image to determine that a visual flaw exists. For example, comparing the exposure metric to an exposure threshold value can be used to indicate an overexposure if the exposure metric deviates above the exposure threshold value or an underexposure if the exposure metric deviates below the exposure threshold value. The image analysis module 120 can also generate adjustment values that can be applied to correct or improve the visual flaw. In this example, the image analysis module 120 generates adjustment values 404 that correspond to modifications to the corresponding image parameters of the rendition image 116 (e.g., modifiable image parameters 118) and/or the corresponding image parameters of the input image 110 (not illustrated here), such as an adjustment value of +1.72 for an exposure image parameter of the rendition image 116 or the input image 110. Thus, the image analysis module 120 can generate the adjustment values 404 that can be applied to either a rendition image or an input image. Each adjustment value can represent a difference to be applied to an image parameter (e.g., adjust the image parameter by "X" amount) or an absolute value for the image parameter (e.g., set the image parameter to "Y").

In another example 402, the image analysis module 120 can identify visual flaws in an input image, and generate adjustment values to correct for the visual flaws and produce visual alterations to the input image. In this example, the image analysis module 120 can analyze the rendition image 304. Instead of an underexposed visual flaw as in the rendition image 116, the rendition image 304 includes an overexposure visual flaw that is identifiable by the image analysis module 120. Adjustment values 406 that correspond to correction values can be generated by the image analysis module 120 to improve the overexposure characteristic by producing visual alterations to the rendition image 304 and/or the input image 302. In this example, the image analysis module 120 generates an adjustment value of −0.30 for an exposure image parameter of the rendition image 304 or the corresponding input image (e.g., input image 302 as shown and described with reference to FIG. 3). Thus, the image analysis module 120 can analyze a rendition image to identify visual flaws, and generate image parameter adjustment values to correct or improve the visual flaws and provide visual alterations in either the rendition image or the input image. In aspects of content-adaptive guided tutorial generation, the guided tutorial generation module 108 can base content to be included in a content-adaptive guided tutorial 114 on the visual flaws as well as the image parameter adjustment values generated from an analysis of a rendition image of an input image.

Figure 5:
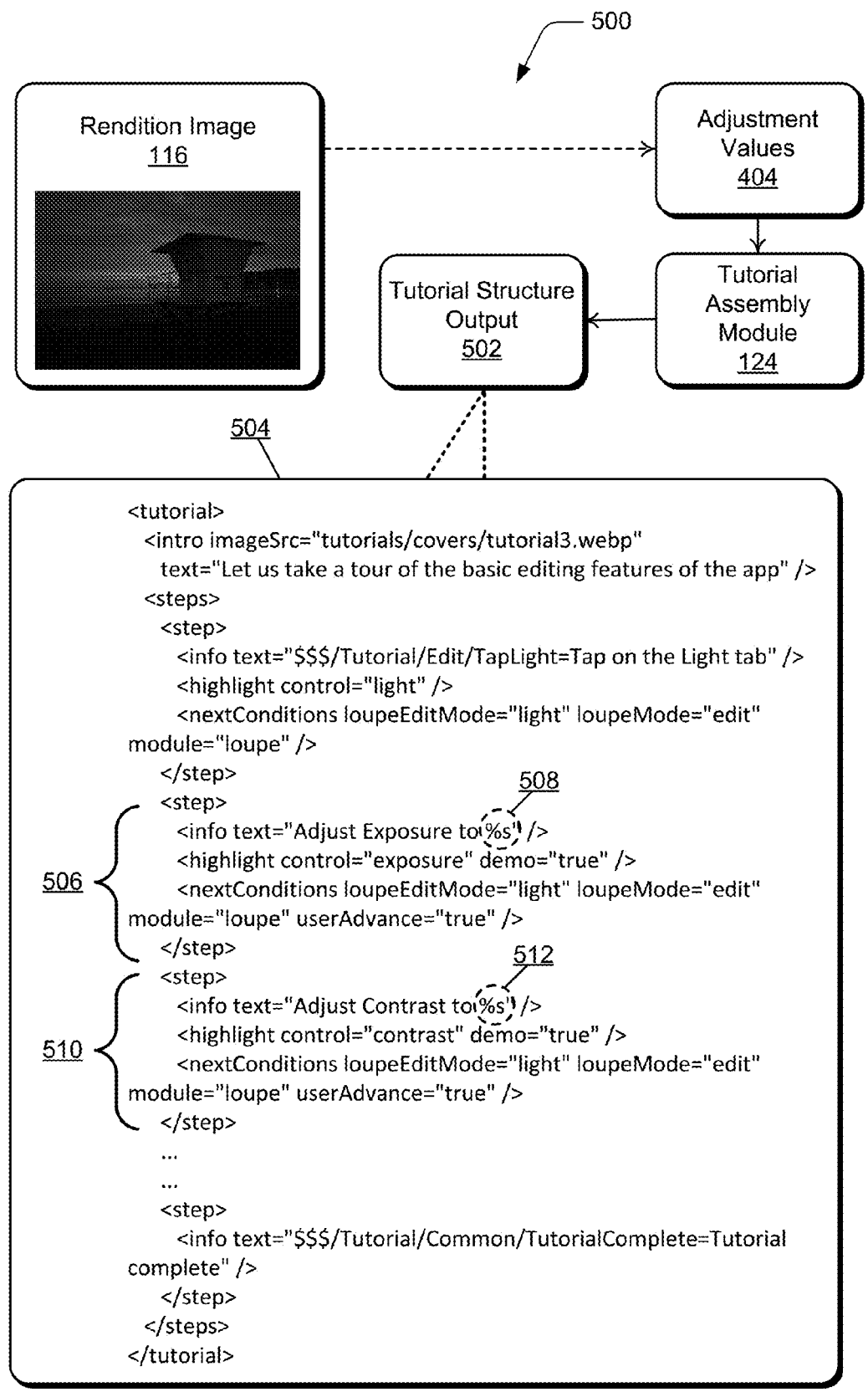

FIG. 5 further illustrates example 500 of features of content-adaptive guided tutorial generation as described herein. The example 500 includes the tutorial assembly module 124 of the guided tutorial generation module 108, as shown and described with reference to FIG. 1, which can be implemented by any of the computing devices described herein, such as the computing device 102, the computing device 202, and/or the server computing device 206. The tutorial assembly module 124 can receive adjustment values from an image analysis module, and generate a content-adaptive guided tutorial 114 based on the adjustment values. In this example, the tutorial assembly module 124 receives the adjustment values 404 that are associated with the rendition image 116 as shown and described with reference to FIGS. 1 and 4. The tutorial assembly module 124 can then generate a tutorial structure output 502 that defines an output structure of a content-adaptive guided tutorial 114 using the adjustment values 404. In this example, the tutorial structure output 502 is formed through the use of a template 504 that includes markup-language describing instructions that indicate how to render a content-adaptive guided tutorial.

Any suitable type of language can be utilized to form the tutorial structure output 502, such as Hypertext Markup Language (HTML), Extensible Markup Language (XML), JavaScript Object Notation (JSON), Generalize Markup Language (GML), and so forth. In implementations, the guided tutorial generation module 108 includes a tutorial engine that processes markup-language files to generate a content-adaptive guided tutorial 114, as described herein. For example, the markup-language files can include instructions on which image-editing tutorials from a library of image-editing tutorials to include in a content-adaptive guided tutorial, and which of the image-editing tutorials to exclude from the content-adaptive guided tutorial.

The template 504 includes an ordering of the instructions that indicate how to render a guided tutorial, and the tutorial assembly module 124 can modify the template 504 to include adjustment parameters specific to a corresponding rendition image (and/or input image). For example, the instructions 506 correspond to guided tutorial instructions that interface with an associated application (e.g., the image-editing application 104 as shown and described with reference to FIG. 1) to provide guidance on how to access and adjust exposure parameters using the image editing controls 106 of the application. Based on the values included in the adjustment values 404, the tutorial assembly module 124 modifies a parameter 508 such that the exposure adjustment value is displayed during playback of the content-adapted guided tutorial 114. The instructions 510 of the template 504 correspond to guided tutorial instructions that indicate how to access and adjust contrast settings. In a similar manner to the exposure adjustment value, the tutorial assembly module 124 modifies a parameter 512 of the template 504 to include a contrast adjustment value when the instructions for accessing the image editing controls associated with modifying contrast parameters is rendered in the content-adaptive guided tutorial.

Figure 6:
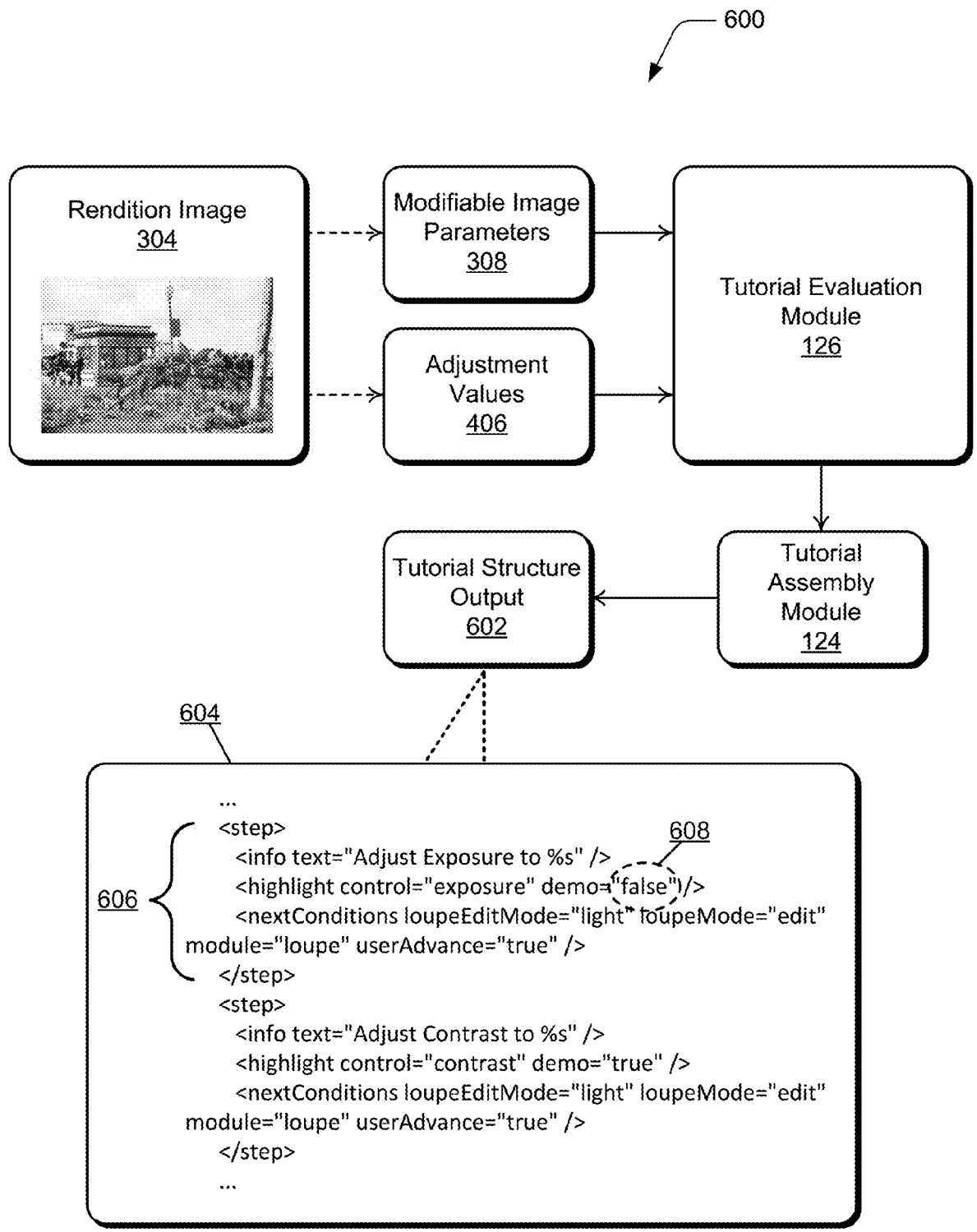

FIG. 6 illustrates example 600 of features of content-adaptive guided tutorial generation as described herein, such as adjustment value evaluation. In implementations, content-adaptive guided tutorial generation includes evaluating the adjustment values to determine which of the adjustment values, and corresponding editing controls, to exclude from a content-adaptive guided tutorial. In this example 600, the tutorial evaluation module 126 of the guided tutorial generation module 108 as shown and described with reference to FIG. 1, can be implemented by any of the computing devices described herein, such as the computing device 102, the computing device 202, and/or the server computing device 206.

The tutorial evaluation module 126 can evaluate adjustment values to identify visually non-productive adjustment values. As used herein, the term "visually non-productive" denotes an alteration in an image that fails to produce a visual change that falls within a threshold value. Alternatively or in addition, "visually non-productive" can apply to a grouping of adjustment values that are prioritized according to an amount of contribution each adjustment value contributes to an overall aesthetic score of an image, where "visually non-productive" adjustment values contribute less to the overall aesthetic score relative to other adjustment values. For example, a grouping of adjustment values can be prioritized according to contribution values and the bottom "N" adjustment values are identified as being visually non-productive.

In this example 600, the tutorial evaluation module 126 can determine which of the adjustment values generated for the rendition image 304 as shown and described with reference to FIG. 4 are visually non-productive based on the modifiable image parameters 308 and the adjustment values 406. Various implementations of the tutorial evaluation module 126 can compute a difference between each of the adjustment values and a corresponding image parameter that the adjustment value alters. For example, an image parameter may have a current value of "3.0" and a corresponding adjustment value with a value of "3.2".

The tutorial evaluation module 126 computes a difference between these values as follows: Adjustment Δ=3.2−3.0=0.2, and then compares the difference to a threshold value that identifies visually non-productive adjustment values, where: Threshold value=1.2 and Adjustment Δ=0.2<1.2. Based on this comparison, the tutorial evaluation module 1264 can determine that the corresponding adjustment value is visually non-productive based on the difference being lower than the threshold value.

As another example, the tutorial evaluation module 126 can evaluate a grouping of differences by sorting the adjustment values from a highest difference to a least difference, where:

Adjustment $\Delta_1$=2.2
Adjustment $\Delta_2$=1.9
Adjustment $\Delta_3$=1.1
Adjustment $\Delta_4$=0.7
Adjustment $\Delta_5$=0.4

The tutorial evaluation module 126 can then select the bottom "X" adjustment values as being visually non-productive. For example, assuming that X=2, the tutorial evaluation module 126 can determine that the adjustment values corresponding to Adjustment $\Delta_4$ and Adjustment $\Delta_5$ are visually non-productive and excludes instructions for the corresponding image-editing controls from the content-adaptive guided tutorial. The tutorial evaluation module 126 can forward the evaluation results (e.g., a notification of the adjustment values identified as being visually non-productive) to the tutorial assembly module 124 as shown and described with reference to FIG. 1. The tutorial assembly module 124 can then exclude the corresponding image-editing controls from the content-adaptive guided tutorial 114.

A tutorial structure output 602 corresponds to instructions that define a structure of a content-adaptive guided tutorial 114 based on the rendition image 304. Similar to the tutorial structure output 502 as shown and described with reference to FIG. 5, the tutorial structure output 602 is based on a template 604 that includes markup-language statements describing rendering instructions for a content-adaptive guided tutorial 114. In this example, the tutorial evaluation module 126 has determined that an adjustment value corresponding to an exposure image parameter is visually non-productive. Based on the determination that the exposure adjustment value is visually non-productive, the tutorial assembly module 124 excludes the corresponding image-editing control from the content-adaptive guided tutorial by modifying markup-language corresponding to instructions 606. In this example, the tutorial assembly module 124 sets parameter 608 to a false state. A tutorial engine that processes the tutorial structure output 602, which corresponds to a modified version of the template 604, can then exclude the exposure editing control from the content-adaptive guided tutorial 114 based on the parameter 608.

Figure 7:
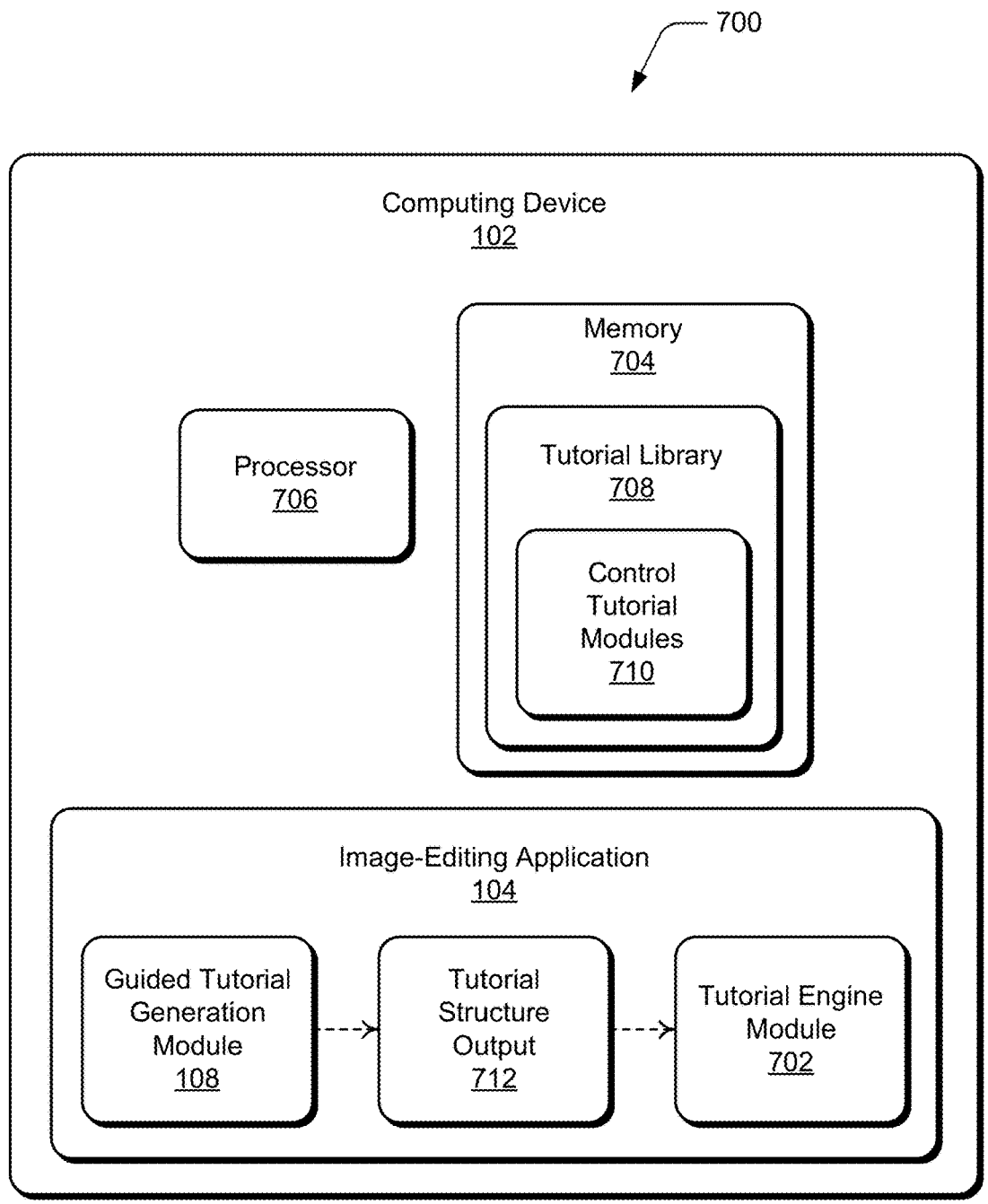
FIG. 7 illustrates a system in which aspects of content-adaptive guided tutorial generation can be implemented.

FIG. 7 illustrates an example system 700 for content-adaptive guided tutorial generation, as further implemented with the computing device 102 that includes the image-editing application 104 and the guided tutorial generation module 108, as shown and described with reference to FIG. 1. In this example, the image-editing application 104 also includes an integrated tutorial engine module 702. In alternate implementations, the tutorial engine module 702 may be implemented as a separate module from the image-editing application 104. Generally, the tutorial engine module 702 represents a processing engine that receives an input of tutorial instructions and invokes or performs actions based on the instructions, such as a markup-language engine.

In this example, the computing device 102 includes a memory 704 and a processor 706, and may include any number and combination of different components as shown and described with reference to the example device shown in FIG. 15. In implementations, the tutorial engine module 702 may include independent processing, memory, and logic components functioning as a computing and/or electronic device integrated with the computing device 102. Alternatively, or in addition, the tutorial engine module 104 can be implemented as a software application or software module, such as computer-executable software instructions that are executable with the processor 706. As a software application, the tutorial engine module 702 can be stored on computer-readable storage memory (e.g., the memory 704), or any suitable memory device or electronic data storage implemented in the computing device 102.

In this example system 700, the device memory 806 maintains a tutorial library 708 that includes various control tutorial modules 710 associated with editing controls. For example, the tutorial library 708 can include any number of the control tutorial modules 812, and each of the control tutorial modules 812 can be associated with an image-editing guided tutorial module that corresponds to an image-editing control of the image-editing application 104 (e.g., a first control tutorial module 812 corresponds to an exposure editing control guided tutorial module; a second control tutorial module 812 corresponds to a brightness editing control guided tutorial module; etc.). The control tutorial modules 812 can be implemented as software applications or software modules, such as computer-executable software instructions that are executable with the processor 706 of the computing device 102. In alternate implementations, the control tutorial modules 812 can be implemented with independent processing, memory, and logic components functioning as a computing and/or electronic device integrated with the computing device 102.

Generally, the tutorial engine module 702 receives an input of instructions associated with generating and/or rendering a content-adaptive guided tutorial 114. In this example, the tutorial engine module 702 receives a tutorial structure output 712 from the guided tutorial generation module 108, as shown and described with reference to FIG. 1. The tutorial structure output 712 represents any suitable set of tutorial instructions that describe how to generate and/or render a content-adaptive guided tutorial 114, such as the tutorial structure outputs 502 and 602 as shown and described with reference to respective FIGS. 5 and 6. In implementations, the tutorial engine module 702 processes the instructions to determine a subset of the content tutorial modules 812 to include in a content-adaptive guided tutorial 114 as described herein.

Figure 8:
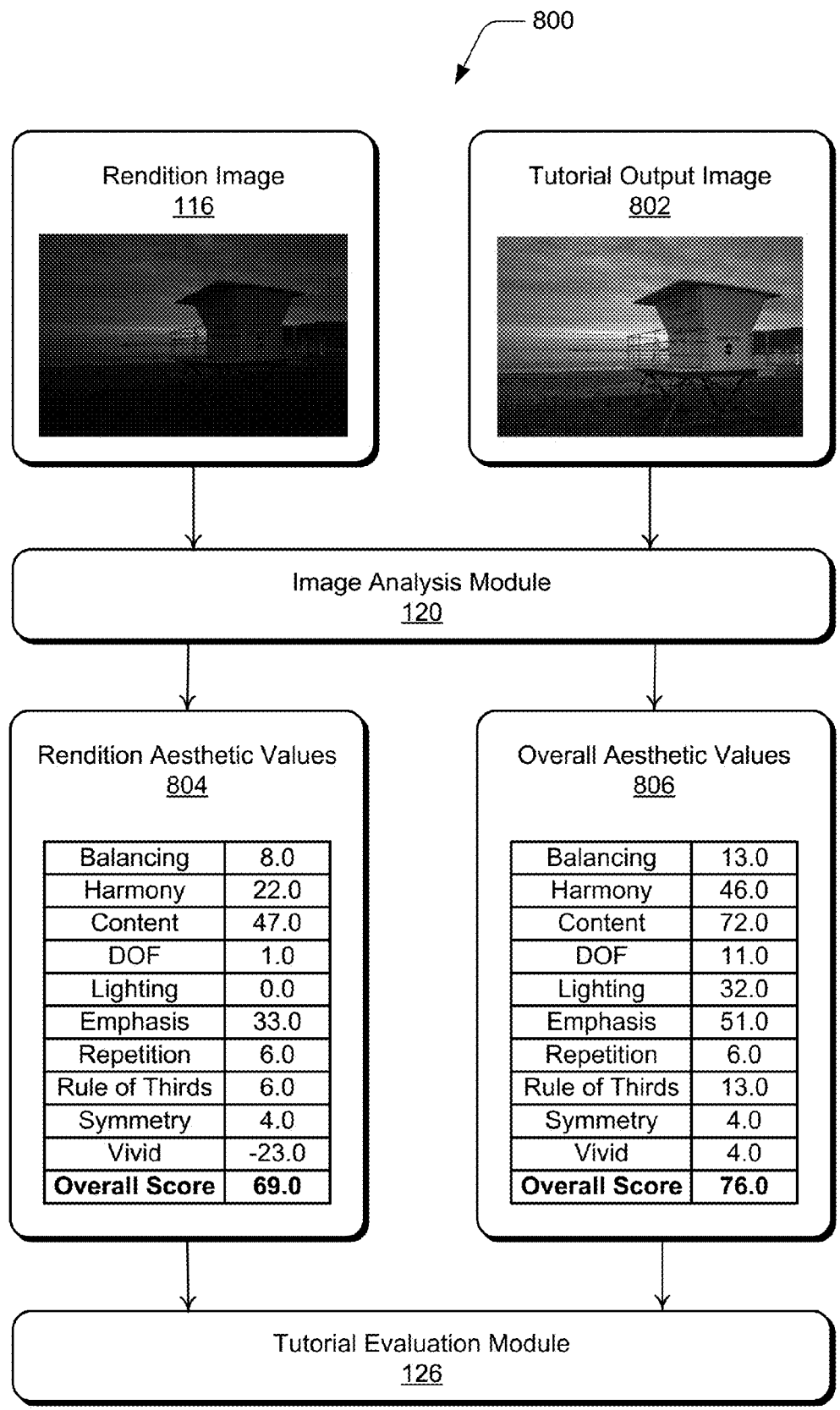
FIGS. 8-10 illustrate example features of content-adaptive guided tutorial generation in accordance with one or more implementations.
Figure 9:
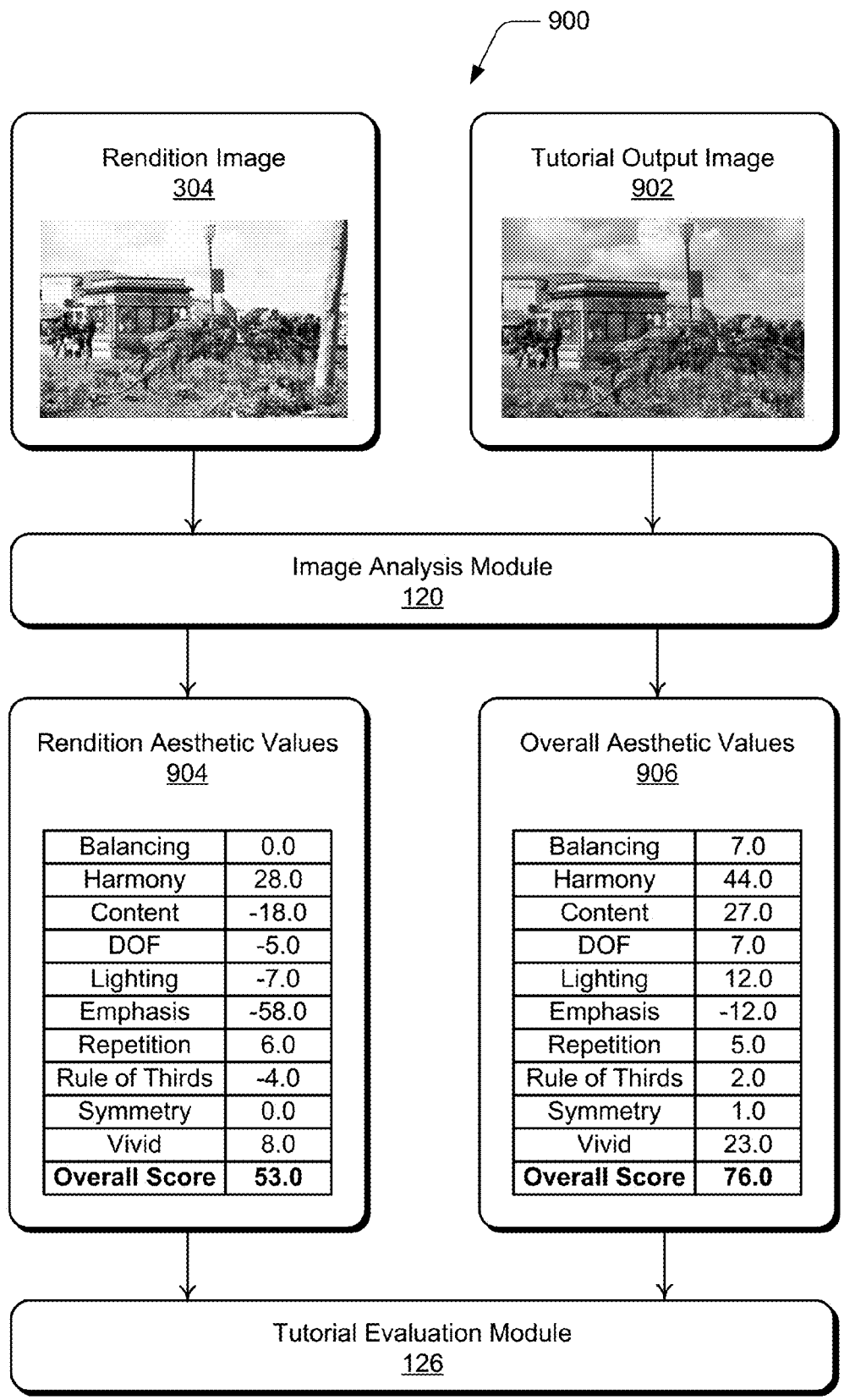

FIGS. 8 and 9 further illustrate examples 800 and 900 of features of content-adaptive guided tutorial generation as described herein, and includes the image analysis module 120 and the tutorial evaluation module 126 of the guided tutorial generation module 108, as shown and described with reference to FIG. 1. In implementations of content-adaptive guided tutorial generation, the modules of the guided tutorial generation module 108 can determine a quality level of a content-adaptive guided tutorial 114, such as by evaluating a quality level of an output generated by the content-adaptive guided tutorial.

The example 800 shown in FIG. 8 includes the rendition image 116 as shown and described with reference to FIG. 1, and includes a tutorial output image 802, which represents an output image that is generated by applying all of the adjustment values included in a generated content-adaptive guided tutorial 114 to the modifiable image parameters 118 of the rendition image 116 and/or to the image parameters 112 of the input image 110 (as shown in FIG. 1). In implementations, an aesthetic score can be determined based on the image-editing controls and adjustment values included in the content-adaptive guided tutorial. Thus, excluded adjustment values and excluded image-editing controls do not contribute to the generation of the tutorial output image 802.

In implementations, the image analysis module 120 can generate metrics about each image to determine a quality level or overall aesthetic score for each of the images. This provides that the image analysis module 120 can determine an effectiveness of the content-adaptive guided tutorial 114 that is generated based on the rendition image 116. In this example, the image analysis module 120 generates rendition aesthetic values 804 based on the rendition image 116 by applying image processing algorithms, machine-learning algorithms, or any combination thereof. For example, the rendition aesthetic values 804 include a balancing metric that provides an indication of color balance and/or white balance within the rendition image 116, and can be generated by applying illuminant estimation algorithms, chromatic adaptation algorithms, etc., to the rendition image 116.

The rendition aesthetic values 804 also include a harmony metric that provides an indication of an aesthetic appeal of a color combination included in the rendition image 116, and can be generated by applying color matching image processing algorithms to the rendition image 116. As another example, the rendition aesthetic values 804 include a symmetry metric that provides an indication of image symmetry within the rendition image 116, and can be based on applying symmetry detection machine-learning algorithms to the rendition image 116. Thus, the image analysis module 120 can apply various image processing algorithms and machine-learning algorithms to generate multiple types of metrics that are then used to determine an overall aesthetic score for the rendition image 116. While the rendition aesthetic values 804 illustrates a particular set of metrics that may contribute to the overall aesthetic score of the rendition image 116, other metrics can be utilized as well.

The image analysis module 120 can also generate overall aesthetic values 806 based on the same algorithms used to generate the rendition aesthetic values 804. This provides the tutorial evaluation module 126 with commensurate information on each image that is then analyzed to determine a quality level and/or effectiveness of the content-adaptive guided tutorial 114 and corresponding adjustment values. In this example, the rendition image 116 has an overall aesthetic score of 69.0 based on the rendition aesthetic values 904, while the tutorial output image 802 has an overall aesthetic score of 76.0 as based on the overall aesthetic values 806. The tutorial evaluation module 126 can compare these scores to determine the quality level and/or effectiveness of the content-adaptive guided tutorial 114 that is used to generate the tutorial output image 802. In implementations, the tutorial evaluation module 126 can determine whether a difference between the two scores meets a threshold value associated with improvement. For example, the tutorial evaluation module 126 may determine that the tutorial output image 802 fails to meet the threshold value of improvement:

Aesthetic Δ=76.0−69.0=7.0
Threshold value=10.0
Aesthetic Δ=7.0<10.0

Based on this evaluation, the tutorial evaluation module 126 can initiate another analysis of the rendition image 116 to determine different adjustment values and/or image-editing controls to include in the content-adaptive guided tutorial 114, and improve the quality level of the tutorial output image 802 and the effectiveness of the content-adaptive guided tutorial.

In the example 900 shown in FIG. 9, the image analysis module 120 analyzes the rendition image 304 and a tutorial output image 902 that is based on the rendition image 304, as shown and described with reference to FIG. 3. The image analysis module 120 can generate the rendition aesthetic values 904 that yield an overall aesthetic score of 53.0 for the rendition image 304, and generate the overall aesthetic values 906 that yield an overall aesthetic score of 76.0 for the tutorial output image 902. Using a same threshold value as described above, the tutorial evaluation module 126 can then determine that the corresponding adjustment values and content-adaptive guided tutorial 114 that generates the tutorial output image 902 have an acceptable quality level and/or effectiveness:

Aesthetic Δ=76.0−53.0=23.0
Threshold value=10
Aesthetic Δ=23.0>10

Thus, a content-adaptive guided tutorial 114 can be analyzed and validated for effectiveness and output quality level.

The tutorial evaluation module 126 can also be implemented to determine a contribution of each corresponding adjustment value to the overall aesthetic score. For example, referring to the tutorial output image 902, applying all of the adjustment values that correspond to the overall aesthetic values 906 generates the overall aesthetic score of 76.0. The tutorial evaluation module 126 can determine a contribution of each adjustment value to the overall aesthetic score by omitting the adjustment value and generating an omitted aesthetic score for a resultant image. Table 1 below illustrates an example of the tutorial evaluation module 126 generating an omitted aesthetic score. In this example, three adjustment values are evaluated: a contrast adjustment value, an exposure adjustment value, and a saturation adjustment value. For each adjustment value, the omitted aesthetic score corresponds to an aesthetic score computed for an image where all adjustment values are applied to a rendition image except the adjustment value being evaluated. In Table 1, the omitted aesthetic score for the contrast adjustment value corresponds to an aesthetic score of an output image generated by applying all of the adjustment values to the modifiable image parameters of rendition image except the contrast adjustment value. This yields an omitted aesthetic score of 69.0. The omitted aesthetic score is then subtracted from the overall aesthetic score of the tutorial output image 902 to determine a contribution of the contrast adjustment value to the overall aesthetic score. As shown in Table 1, the contrast adjustment value contributes an aesthetic value of 7.0 to the overall aesthetic score:

TABLE 1

Omitted Aesthetic Scores to Determine Aesthetic Contribution

| Removed Setting | Omitted Aesthetic Score | Adjustment Contribution | Priority |
| --- | --- | --- | --- |
| Contrast | 69.0 | 76.0 − 69.0 = 7.0 | 2 |
| Exposure | 73.0 | 76.0 − 73.0 = 3.0 | 3 |
| Saturation | 63.0 | 76.0 − 63.0 = 13.0 | 1 |

The tutorial evaluation module 126 can repeat the process for each adjustment value to determine an omitted aesthetic score and contribution of the respective adjustment value to the overall aesthetic score. In this example, the exposure adjustment value contributes an aesthetic value of 3.0 to the overall aesthetic score of the tutorial output image 902, while the saturation adjustment value contributes an aesthetic value of 13.0 to the overall aesthetic score of the tutorial output image 902. The tutorial evaluation module 126 can then prioritize the adjustment values relative to one another by prioritizing adjustment values with higher contribution values at a higher priority than adjustment values with lower contribution values. In terms of Table 1, the saturation adjustment value is given the highest priority based on having the highest contribution to the overall aesthetic contribution to the tutorial output image 902, followed by the contrast adjustment value, and then the exposure adjustment value. The prioritization of the adjustment values can be used by the guided tutorial generation module 108 to order a presentation of the corresponding image-editing controls in a content-adaptive guided tutorial 114, as described herein.

Figure 10:
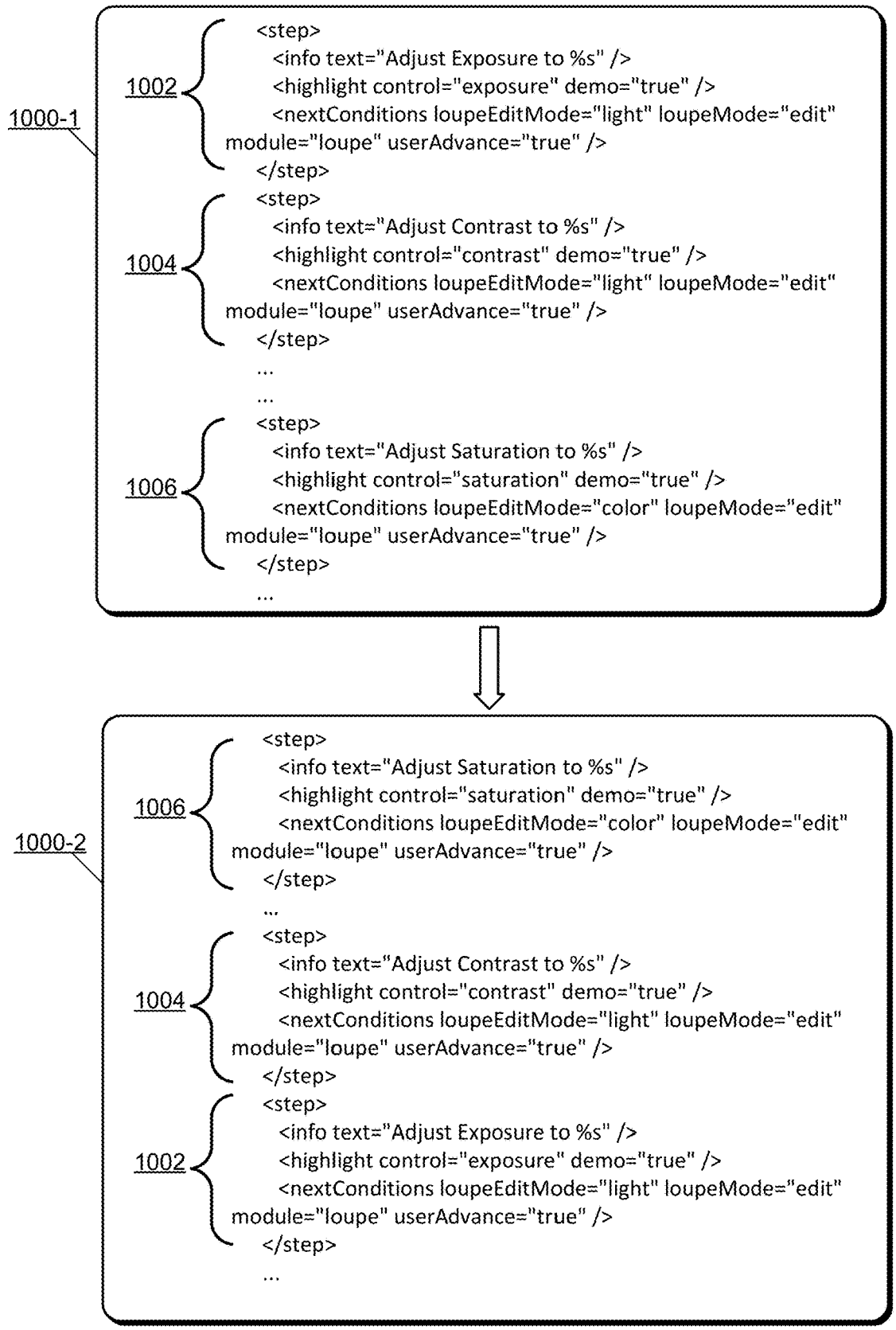

FIG. 10 illustrates aspects of content-adaptive guided tutorial generation in which image-editing controls and corresponding adjustment values are displayed in a content-adaptive guided tutorial 114 based on a prioritization, such as the prioritization based on the contribution of an adjustment value to an overall aesthetic score of an output image, as shown and described above with reference to FIGS. 8 and 9. The upper portion of FIG. 10 shows an example tutorial structure output 1000-1, while the lower portion shows a modified version of the tutorial structure output, denoted as modified tutorial structure output 1000-2. In implementations, the tutorial structure output 1000-1 and/or the modified tutorial structure output 1000-2 represents any of the various tutorial structure outputs 502, 602, and 712 as shown and described with reference to respective FIGS. 5, 6, and 7.

The tutorial structure output 1000-1 includes markup-language that describes instructions corresponding to the generation of a content-adaptive guided tutorial 114. The tutorial structure output 1000-1 includes at least three sets of instructions: instructions 1002, which correspond to rendering instructions for navigating an exposure setting editing control; instructions 1004, which correspond to rendering instructions for navigating a contrast setting editing control; and instructions 1006, which correspond to rendering instructions for navigating a saturation setting editing control. In the tutorial structure output 1000-1, instructions are ordered in the markup-language such that the instructions 1002 corresponding to the exposure setting editing control are displayed first, followed by the contrast setting editing control instructions 1004, followed by the saturation setting editing control instructions 1006.

In implementations, the presentation order of the image-editing controls 106 can be repositioned based on a prioritization, such as the prioritization described with reference to Table 1. This is further illustrated in the lower portion of FIG. 10, where the modified tutorial output structure 1000-2 includes the instructions having been repositioned such that the instructions 1006 corresponding to the saturation setting editing control are positioned first in the presentation order; the instructions 1004 corresponding to the contrast setting editing control are positioned second in the presentation order; and the instructions 1002 corresponding to the exposure setting editing control are positioned third in the presentation order. By reordering the presentation of the image-editing controls based on a prioritization, the user experience can be enhanced by providing more perceptible differences to the output image earlier in the content-adaptive guided tutorial. This presents the user with more dramatic and perceptible feedback as measured by the aesthetic values early in the tutorial, thus keeping the user engaged in viewing the tutorial and providing a positive user experience.

In the example environments and relating to the various features described herein, the guided tutorial generation module 108 creates a content-adaptive guided tutorial 114 for an image-editing application 104 based on an input image. In aspects of content-adaptive guided tutorial generation, other content-adaptive guided tutorials can be generated by the guided tutorial generation module 108 for other types of applications, such as a video editing application, an audio editing application, a text editing application, a portable document format (PDF) editing application, and so forth. Similar to the examples and features described with reference to images, the guided tutorial generation module 108 can receive various types of input content and analyze the input content for flaws or errors to correct, such as imaging or audible flaws in video content, audible flaws in audio content, formatting flaws in PDF files, formatting flaws in text files, and so forth.

In implementations, the guided tutorial generation module 108 can generate copy content from the input content. Similar to the examples and features described with reference to rendition images, the copy content can replicate a current content state of the input content as modifiable content parameters. This can include generating copy content with less digital data relative to the input content that is analyzed to identify flaws or errors instead of the input content to improve analysis and computation times. As an example, the guided tutorial generation module 108 can generate a rendition copy of an input video file that maintains an audio level and/or image level of the input content and replicates video parameters that characterize a current state of the input video file (e.g., bitrate parameter, image parameters, audio parameters, etc.). The file size, image resolution, and/or audio quality level of the copy content can be based on the resources of a computing device as described herein.

The guided tutorial generation module 108 can analyze the copy content to determine adjustment values. As described herein, the analysis can include applying machine-learning algorithms, image processing algorithms, audio processing algorithms, or other types of detection algorithms as a way to identify the flaws included in the copy content and/or the input content. These types of algorithms can also be used to generate adjustment values that are applied to correct the flaws and produce alterations in the input content. By analyzing copy content with less digital data relative to the input content to generate the adjustment values, the computing device can identify adjustment values more quickly, which frees up the processing resources of the computing device. The adjustment values can then be included in a content-adaptive guided tutorial 114 that provides navigation instructions of how a user can access the corresponding image-editing controls and initiate modifications to the content copy or the input content using the adjustment values effective to generate modified copy content. In implementations, the guided tutorial generation module 108 optionally determines a quality level and/or effectiveness of the content-adaptive guided tutorial 114, a quality level of the adjustment parameters, and/or prioritizes the presentation of the adjustment parameters described herein.

In other aspects of content-adaptive guided tutorial generation, existing guided tutorials can be selected based on an analysis of the input content. As one example, the guided tutorial generation module 108 can analyze input content, or a rendition copy of the input content, to identify flaws and adjustment values that correct the flaws. In implementations, the guided tutorial generation module 108 selects an existing guided tutorial that provides more improvement to the input content relative to other existing guided tutorials, such as by selecting an existing guided tutorial that corresponds to an adjustment value that provides significant changes to the input content. For example, the content-adaptive generation module 108 can generate and analyze adjustment values based on the flaws, and identify one of the adjustment values that deviates more from an ideal value relative to the other adjustment values. Alternatively, or in addition, the guided tutorial generation module 108 can optionally compute and compare aesthetic scores based on the adjustment values as described herein to identify an adjustment value that provides more improvement to the input content relative to other adjustment values. In various implementations, an adjustment value can be selected and the existing tutorials searched through, such as in tutorial library 708 as shown and described with reference to FIG. 7, to identify an existing guided tutorial that includes instructions for a corresponding image-editing control associated with the adjustment value. Thus, in aspects of content-adaptive guided tutorial generation, the guided tutorial generation module 108 can recommend an existing tutorial based on content analysis and in lieu of dynamically generating a content-adaptive guided tutorial.

Example methods 1100, 1200, 1300, and 1400 are described with reference to respective FIGS. 11-14 in accordance with one or more aspects of content-adaptive guided tutorial generation. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively, or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 11:
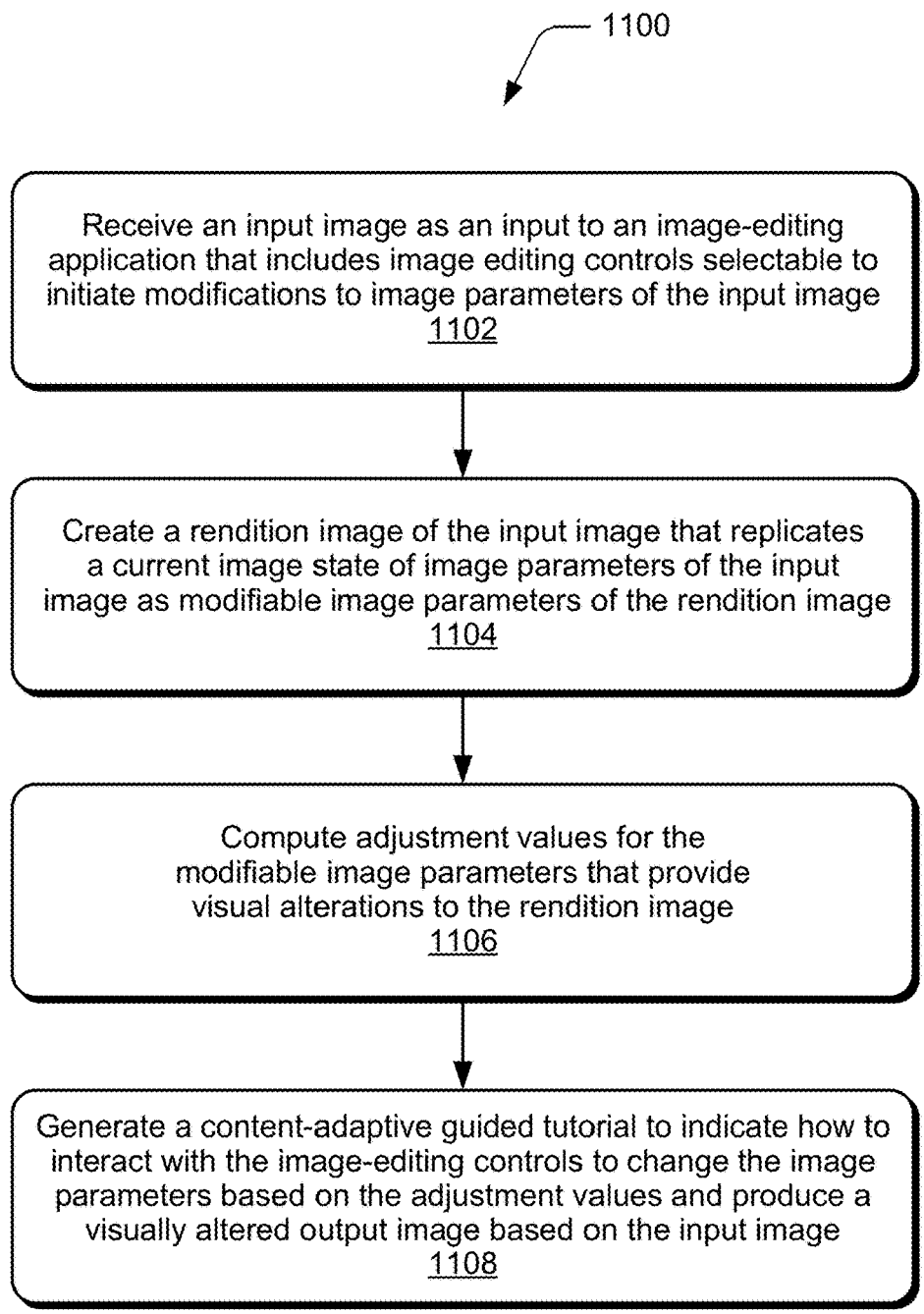
FIGS. 11-14 illustrate example methods of content-adaptive guided tutorial generation in accordance with embodiments of the techniques described herein.

FIG. 11 illustrates an example method 1100 for content-adaptive guided tutorial generation, and is generally described with reference to the guided tutorial generation module as shown and described with reference to FIGS. 1-10. The order in which the method is described is not intended to be construed as a limitation, and any number or combination of the method operations can be combined in any order to implement a method, or an alternate method.

At 1102, an input image is received as an input to an image-editing application that includes image-editing controls selectable to initiate modifications to image parameters of the input image. For example, the image-editing application 104 receives the input image 110 as an input, and the image-editing application 104 includes the image-editing controls 106 that are selectable to initiate modifications to the image parameters 112 of the input image. The image-editing application 104 can be implemented by the computing device 102, the computing device 202, and/or by the server computing device 206. In implementations, the image-editing application 104 includes, and/or communicates with, the guided tutorial generation module 108, which can access the input image via the image-editing application. The input image 110 can be uploaded or input by a user to the image-editing application 104, such as a digital image selected by the user from a stock photo, from images currently available in the image-editing application, downloaded from a network, available on a client device of the user, and so forth.

At 1104, a rendition image of the input image is created, where the rendition image replicates a current image state of image parameters of the input image as modifiable image parameters of the rendition image. For example, the guided tutorial generation module 108 creates the rendition image 116, where the rendition image replicates a current image state of the image parameters 112 of the input image 110 as the modifiable image parameters 118 of the rendition image. In implementations, the guided tutorial generation module 108 can create the rendition image 116 as a modified version of the input image 110 that has a smaller image resolution size and/or a smaller file size relative to the input image. The image resolution size and/or file size of the rendition image 116 can be based on an analysis of available resources of a computing device processing the rendition image. The rendition image 116 may also be automatically created when the input image 110 is received and without explicit user input to initiate the generation of a content-adaptive guided tutorial 114.

At 1106, adjustment values are computed for the modifiable image parameters that provide visual alterations to the rendition image. For example, the guided tutorial generation module 108 computes, based on an image analysis of the rendition image 116, the adjustment values 122 for the modifiable image parameters 118 that provide the visual alterations to the rendition image. The image analysis module 120 of the guided tutorial generation module 108 can apply image processing algorithms, machine-learning algorithms, or any combination thereof, to identify visual flaws in the rendition image 116 and to compute the adjustment values 122 that correct the visual flaws. In implementations, the image analysis module 120 and/or the tutorial evaluation module 126 evaluate the adjustment values 122 to identify visually non-productive adjustment values and/or to determine whether to regenerate the adjustment values as described herein.

At 1108, a content-adaptive guided tutorial is generated to indicate how to interact with the image-editing controls to change the image parameters based on the adjustment values and produce a visually altered output image based on the input image. For example, the guided tutorial generation module 108 generates the content-adaptive guided tutorial 114 to indicate how a user can interact with the image-editing controls 106 of the image-editing application 104 to change the image parameters 112 based on the adjustment values 122 and produce a visually altered output image 128 based on the input image. In implementations, the tutorial assembly module 124 of the guided tutorial generation module 108 uses the adjustment values 122 and determines a quality level of the content-adaptive guided tutorial 114 that is generated to show a user how to manipulate the image-editing controls 106 and visually alter the input image 110.

Figure 12:
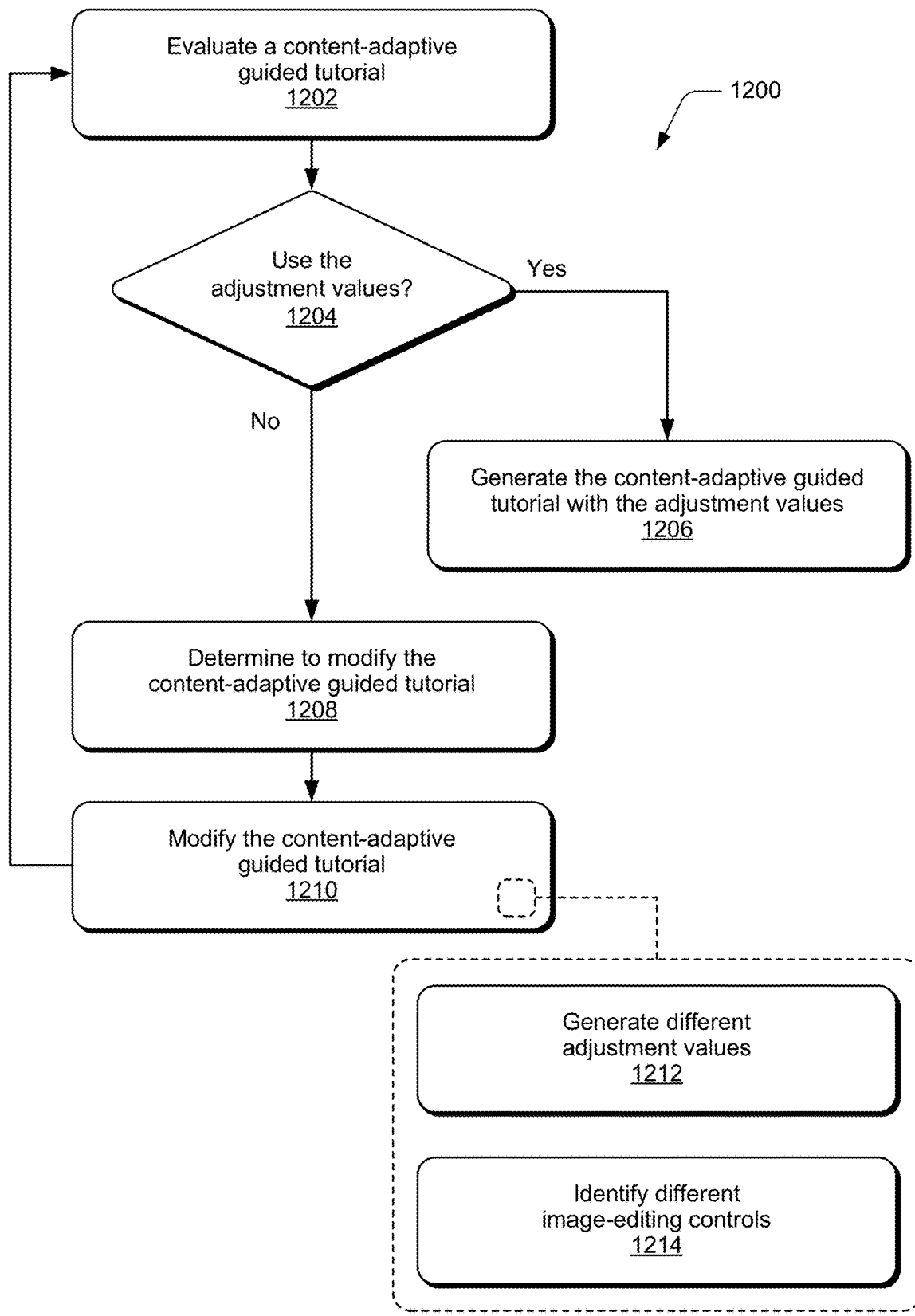

FIG. 12 illustrates an example method 1200 for content-adaptive guided tutorial generation, and is generally described with reference to the guided tutorial generation module as shown and described with reference to FIGS. 1-10. The order in which the method is described is not intended to be construed as a limitation, and any number or combination of the method operations can be combined in any order to implement a method, or an alternate method.

At 1202, a content-adaptive guided tutorial is evaluated, such as by the tutorial evaluation module 126 evaluating the content-adaptive guided tutorial 114 generated by the tutorial assembly module 124. In implementations, evaluating the content-adaptive guided tutorial includes generating aesthetic scores for images modified by applying the adjustment values to corresponding image parameters. The evaluating can also include generating aesthetic scores for images unadjusted by the adjustment values. The tutorial evaluation module 126 can compare a difference between the aesthetic scores to a quality level threshold value. In implementations, evaluating the content-adaptive guided tutorial can include analyzing a number of instructions utilized to generate output content. At 1204, the evaluation is used to determine whether to use the adjustment values. For example, if the difference indicates the quality level has been achieved, the method proceeds to 1206, where the content-adaptive guided tutorial 114 is generated with the adjustment values and the corresponding image-editing controls. If the difference indicates the quality level has not been achieved, the method proceeds to 1208.

At 1208, the tutorial evaluation module 126 determines to modify the content-adaptive guided tutorial based on the evaluation. In implementations, the tutorial evaluation module 126 notifies the image analysis module 120 to modify the content-adaptive guided tutorial, such as by initiating an additional image analysis on the rendition image. At 1210, the guided tutorial generation module modifies the content-adaptive guided tutorial. For example, the image analysis module 120 can reevaluate the rendition image by applying any combination of image processing algorithms and machine-learning algorithms to identify different visual flaws in the rendition image. In implementations, modifying the content-adaptive guided tutorial includes generating different adjustment values at 1212, identifying different image-editing controls at 1214, or any combination thereof, and using the different adjustment values and/or the different editing controls to generate a modified content-adaptive guided tutorial. The method then returns to 1202, where the modified content-adaptive guided tutorial is evaluated, such as by evaluating a number of instructions included in the modified content-adaptive guided tutorial, evaluating an output image based on the modified content-adaptive guided tutorial, etc.

Figure 13:
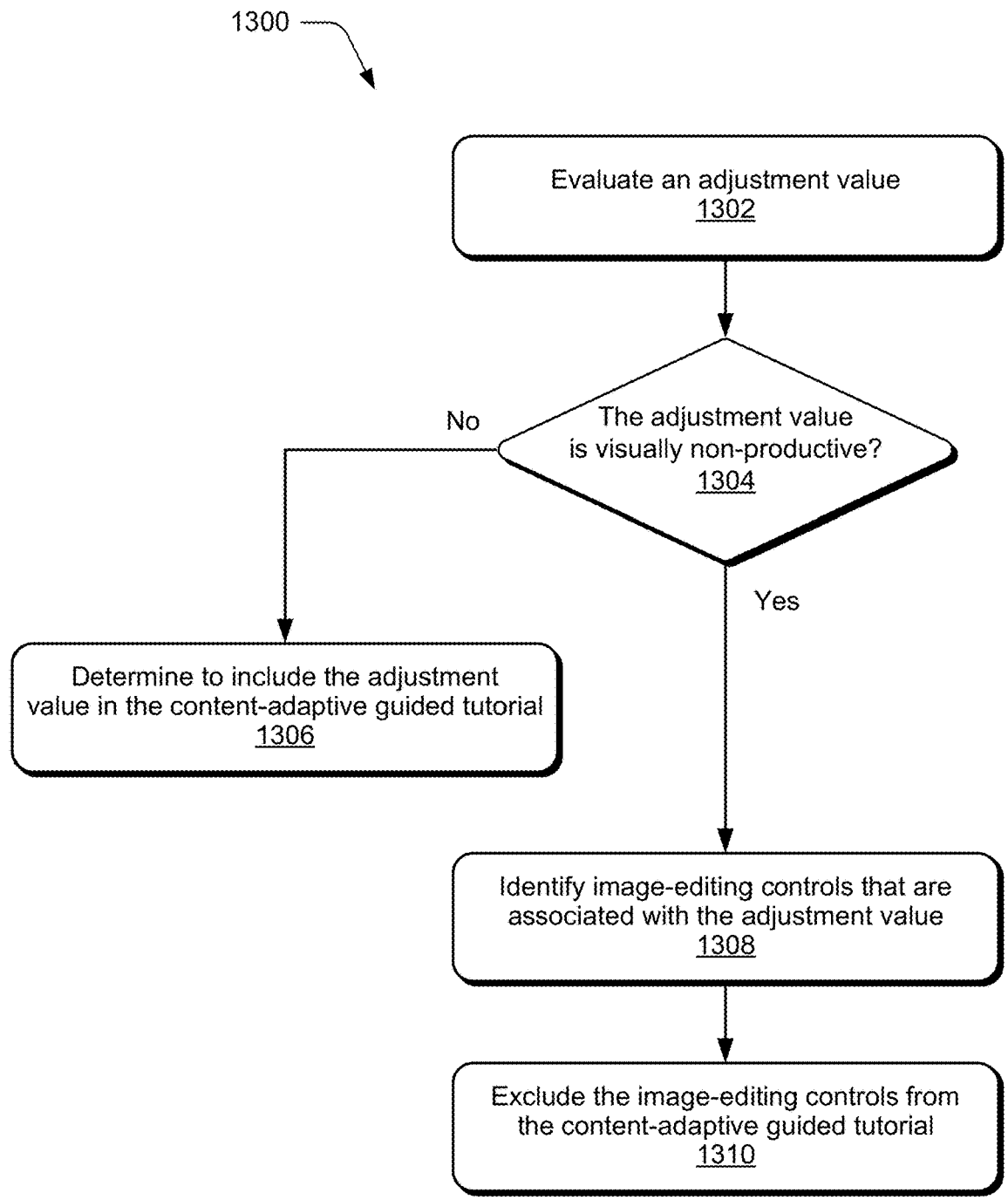

FIG. 13 illustrates an example method 1300 for content-adaptive guided tutorial generation, and is generally described with reference to the guided tutorial generation module as shown and described with reference to FIGS. 1-10. The order in which the method is described is not intended to be construed as a limitation, and any number or combination of the method operations can be combined in any order to implement a method, or an alternate method.

At 1302, an adjustment value is evaluate, such as by the tutorial evaluation module 126 that evaluates the adjustment value by computing a difference between the adjustment value and a current image parameter corresponding to the adjustment value. The difference is then compared to a threshold value that defines visually non-productive adjustment values. In implementations, evaluating the adjustment value can include prioritizing the adjustment value against other adjustment values based on the difference. At 1304, the prioritization or the difference is evaluated to determine whether the adjustment value is visually non-productive. For example, when the difference fails to meet or exceed the threshold value, the adjustment value is determined as being visually non-productive. As another example, when the priority of the adjustment value places the adjustment value near or at the bottom of a grouping of adjustment values, the adjustment value is determined as being visually non-productive. The method proceeds to 1306 for adjustment values that are determined as being visually productive, where the guided tutorial generation module 108 determines to include the adjustment value and the corresponding image-editing controls in the content-adaptive guided tutorial. Conversely, the method proceeds to 1308 for adjustment values that are identified as being visually non-productive.

At 1308, the guided tutorial generation module identifies image-editing controls that are associated with the adjustment value. This can include identifying a single image-editing control or multiple image-editing controls. In implementations, the tutorial assembly module 124 receives a notification of a visually non-productive adjustment value from the tutorial evaluation module 126, and searches through a template of markup-language instructions to locate the instructions that correspond to the visually non-productive adjustment value. At 1310, the tutorial assembly module 124 excludes the image-editing controls from the content-adaptive guided tutorial, such as by modifying the template of markup-language to remove the instructions associated with the image-editing controls or setting a corresponding state parameter to false.

Figure 14:
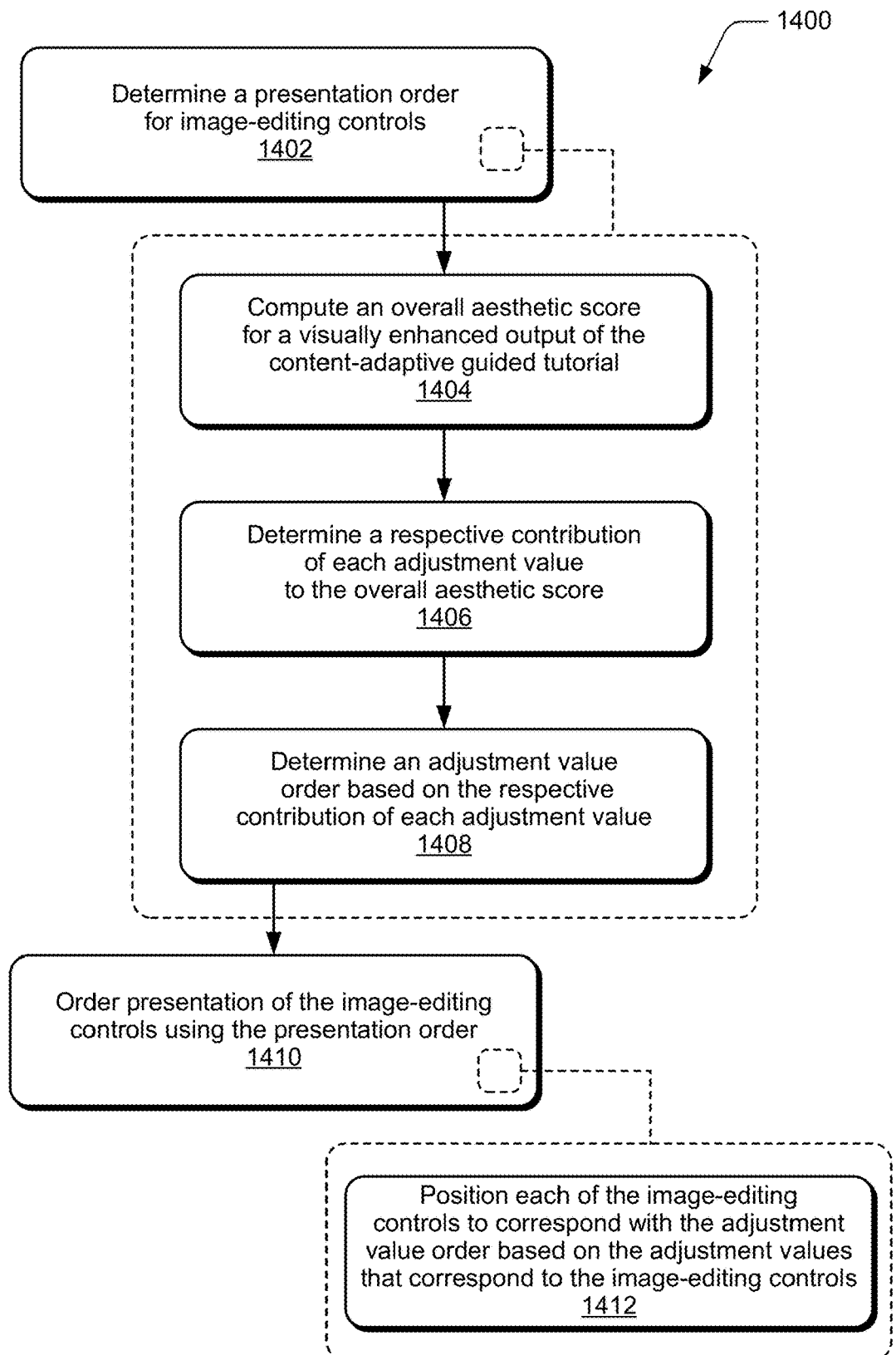

FIG. 14 illustrates an example method 1400 for content-adaptive guided tutorial generation, and is generally described with reference to the guided tutorial generation module 108 as shown and described with reference to FIGS. 1-10. The order in which the method is described is not intended to be construed as a limitation, and any number or combination of the method operations can be combined in any order to implement a method, or an alternate method.

At 1402, a presentation order for image-editing controls is determined in a content-adaptive guided tutorial. For example, one or more modules of the guided tutorial generation module 108 determine the presentation order for the image-editing controls, which can be based on any type of prioritization, such as a prioritization of the corresponding adjustment values. Example functionality for determining a prioritization of the adjustment values is described at 1404, 1406, 1408, and 1410.

At 1404, an overall aesthetic score for a visually enhanced output of the image-editing guided tutorial is computed. The visually enhanced output corresponds to an output generated with all of the adjustment values included in a content-adaptive generated tutorial having been applied to the corresponding content parameters, such as the adjustment values having been applied to the modified image parameters of a rendition image or the adjustment values having been applied to the image parameters of an input image. In implementations, the image analysis module 120 applies image processing algorithms and/or machine-learning algorithms to the visually enhanced output to generate aesthetic metrics that provide the overall aesthetic score, examples of which are provided herein.

At 1406, a respective contribution of each adjustment value to the overall aesthetic score is determined. In implementations, the respective contribution is determined by one or more modules of the guided tutorial generation module 108 computing an omitted aesthetic score that is based on an output image generated by applying all of the adjustment values to the corresponding content parameters, except the adjustment value being evaluated. A difference between the overall aesthetic score and the omitted aesthetic score is computed and used to determine the respective contribution.

At 1408, an adjustment value order is determined based on the respective contribution of each adjustment value. For example, the tutorial evaluation module 126 can place higher contributing adjustment values before lower contributing adjustment values in the adjustment value order. In implementations, the tutorial evaluation module 126 forwards the adjustment value order to the tutorial assembly module 124 to use as a basis for the presentation order of the image-editing controls.

At 1410, presentation of the image-editing controls are ordered in the content-adaptive guided tutorial using the presentation order. This can include one or more modules of the guided tutorial generation module 108 positioning each of the image-editing controls to correspond with the adjustment value order based on the adjustment values that correspond to the image-editing controls at 1412. To order the image-editing controls, the tutorial assembly module 124 can modify a template of markup instructions that describe how to render or generate the content-adaptive guided tutorial such that the image-editing instructions follow the presentation order.

Figure 15:
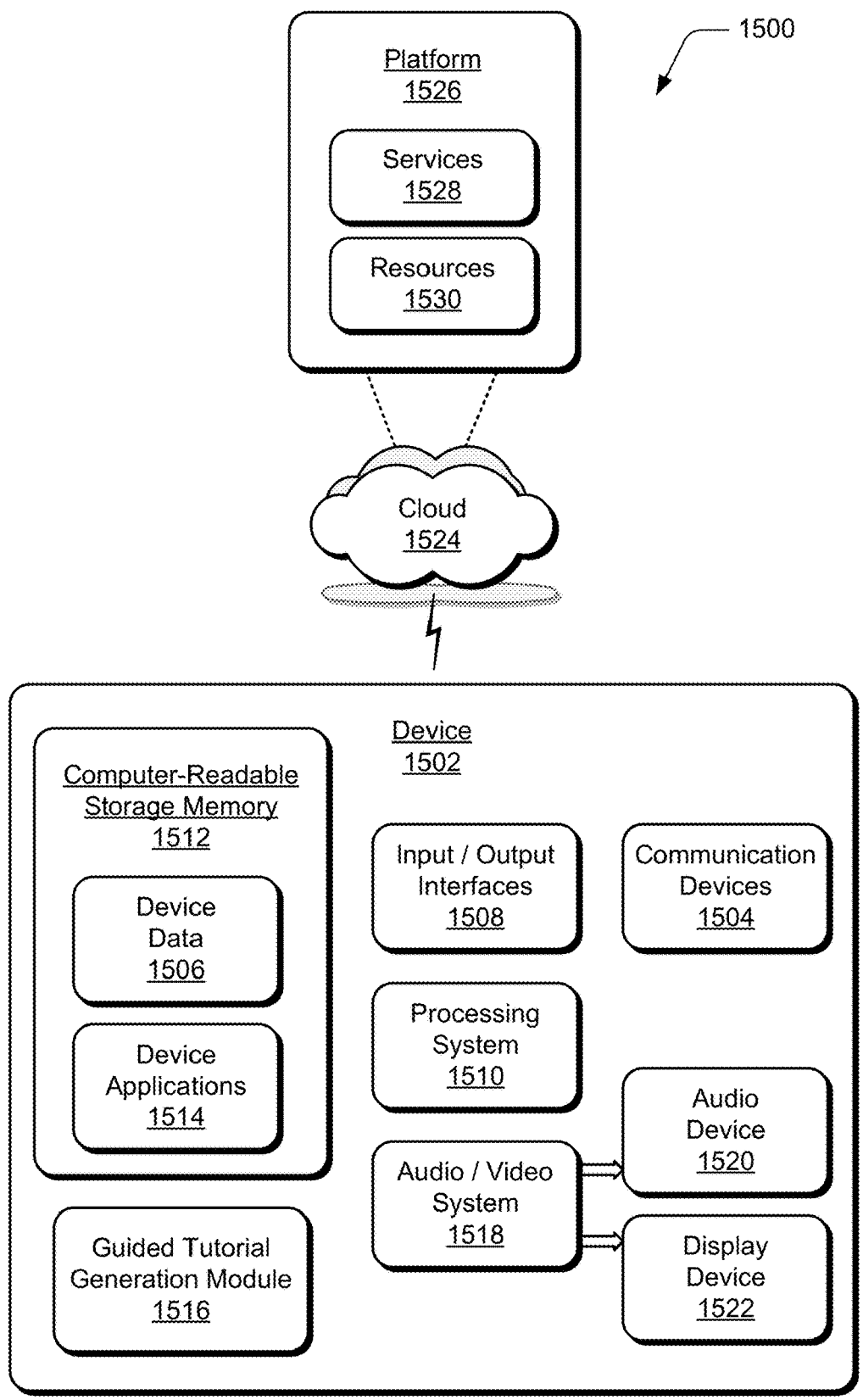
FIG. 15 illustrates an example system with an example device that can implement embodiments of content-adaptive guided tutorial generation.

FIG. 15 illustrates an example system 1500 that includes an example device 1502, which can implement techniques of content-adaptive guided tutorial generation. The example device 1502 can be implemented as any of the computing devices, mobile devices, server devices, and/or services described with reference to the previous FIGS. 1-14, such as any type of computing device, client device, mobile phone, tablet, communication, entertainment, gaming, media playback, and/or other type of device. For example, the computing device 102, the computing device 202, the server computing device 206, and/or various server devices of the network system 204 may be implemented as the example device 1502.

The example device 1502 includes communication devices 1504 that enable wired and/or wireless communication of device data 1506, such as an input image, a rendition image, a tutorial structure output file, adjustment values, and image parameters, as well as computer applications data and content that is transferred from one computing device to another, and/or synched between multiple computing devices. The device data 1506 can include any type of audio, video, image, and/or graphic data that is generated by applications executing on the device. The communication devices 1504 can also include transceivers for cellular phone communication and/or for network data communication.

The example device 1502 also includes input/output (I/O) interfaces 1508, such as data network interfaces that provide connection and/or communication links between the device, data networks, and other devices. The I/O interfaces can be used to couple the device to any type of components, peripherals, and/or accessory devices, such as a digital camera device and/or computer input device that may be integrated with the example device 1502. The I/O interfaces also include data input ports via which any type of data, media content, and/or inputs can be received, such as user inputs to the device, as well as any type of audio, video, and/or image data received from any content and/or data source.

The example device 1502 includes a processing system 1510 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The example device 1502 may further include any type of a system bus or other data and command transfer system that couples the various components within the device. A system bus can include any one or combination of different bus structures and architectures, as well as control and data lines.

The example device 1502 also includes computer-readable storage memory 1512, such as data storage devices implemented in hardware that can be accessed by a computing device, and that provide persistent storage of data and executable instructions (e.g., software applications, modules, programs, functions, and the like). The computer-readable storage memory described herein excludes propagating signals. Examples of computer-readable storage memory include volatile memory and non-volatile memory, fixed and removable media devices, and any suitable memory device or electronic data storage that maintains data for computing device access. The computer-readable storage memory 1512 can include various implementations of random access memory (RAM), read-only memory (ROM), flash memory, and other types of storage memory in various memory device configurations.

The computer-readable storage memory 1512 provides storage of the device data 1506 and various device applications 1514, such as an operating system that is maintained as a software application with the computer-readable storage memory and executed by the processing system 1510. In this example, the device 1502 includes a guided tutorial generation module 1516 that implements the described techniques of content-adaptive guided tutorial generation, and may be implemented with hardware components and/or in software as one of the device applications 1514, such as when the example device 1502 is implemented as the computing device 102, the computing device 202, and/or the server computing device 206 shown in FIGS. 1-3. An example of the guided tutorial generation module 1516 includes the guided tutorial generation module 108 that is implemented as a software application and/or as hardware components by the computing device 102, the computing device 202, the server computing device 206, and/or by other various server devices of the network system 204, as described with reference to FIGS. 1-14. In implementations, the guided tutorial generation module 1516 may include independent processing, memory, and logic components as a computing and/or electronic device integrated with the example device 1502.

The example device 1502 also includes an audio and/or video system 1518 that generates audio data for an audio device 1520 and/or generates display data for a display device 1522. The audio device and/or the display device include any devices that process, display, and/or otherwise render audio, video, display, and/or image data. In implementations, the audio device and/or the display device are integrated components of the example device 1502. Alternatively, the audio device and/or the display device are external, peripheral components to the example device. In embodiments, at least part of the techniques described for content-adaptive guided tutorial generation may be implemented in a distributed system, such as over a "cloud" 1524 in a platform 1526. The cloud 1524 includes and/or is representative of the platform 1526 for services 1528 and/or resources 1530. For example, the services 1528 may include the network system 204 described with reference to FIG. 2.

The platform 1526 abstracts underlying functionality of hardware, such as server devices (e.g., included in the services 1528) and/or software resources (e.g., included as the resources 1530), and connects the example device 1502 with other devices, servers, etc. The resources 1530 may also include applications and/or data that can be utilized while computer processing is executed on servers that are remote from the example device 1502. Additionally, the services 1528 and/or the resources 1530 may facilitate subscriber network services, such as over the Internet, a cellular network, or Wi-Fi network. The platform 1526 may also serve to abstract and scale resources to service a demand for the resources 1530 that are implemented via the platform, such as in an interconnected device embodiment with functionality distributed throughout the system 1500. For example, the functionality may be implemented in part at the example device 1502 as well as via the platform 1526 that abstracts the functionality of the cloud 1524.

Although implementations of content-adaptive guided tutorial generation have been described in language specific to features and/or methods, the appended claims are not necessarily limited to the specific features or methods described. Rather, the specific features and methods are disclosed as example implementations of content-adaptive guided tutorial generation, and other equivalent features and methods are intended to be within the scope of the appended claims. Further, various different examples are described and it is to be appreciated that each described example can be implemented independently or in connection with one or more other described examples.

The invention claimed is:

1. In a digital medium environment for generating a content-adaptive guided tutorial based on an input image, a method implemented by at least one computing device, the method comprising:
   receiving the input image as an input to an image-editing application that includes image-editing controls selectable to initiate modifications to image parameters of the input image;
   creating a rendition image of the input image, the rendition image replicating the image parameters of the input image as modifiable image parameters of the rendition image;
   computing, based on an image analysis of the rendition image, adjustment values for the modifiable image parameters that provide one or more visual alterations to the rendition image; and
   generating the content-adaptive guided tutorial to indicate how to interact with the image-editing controls to change the image parameters based on the adjustment values and produce a visually altered output image based on the input image.

2. The method as recited in claim 1, further comprising:
   determining that an adjustment value of the adjustment values for the modifiable image parameters is visually non-productive;
   identifying the image-editing controls that are associated with the adjustment value; and
   excluding, from the content-adaptive guided tutorial, instructions that would otherwise indicate how to interact with the image-editing controls associated with the adjustment value.

3. The method as recited in claim 2, wherein the determining that the adjustment value is visually non-productive comprises:
   computing a difference between the adjustment value and an image parameter of the modifiable image parameters that the adjustment value alters;
   comparing the difference to a threshold value; and
   determining the adjustment value is visually non-productive based on the difference being lower than the threshold value.

4. The method as recited in claim 1, wherein the generating the content-adaptive guided tutorial comprises:
   accessing a markup-language template of instructions that indicate how to render the content-adaptive guided tutorial; and
   modifying the markup-language template to include the adjustment values.

5. The method as recited in claim 4, further comprising:
   identifying an image-editing control of the image-editing controls to exclude from the content-adaptive guided tutorial, each of the image-editing controls associated with a respective one of the adjustment values, the identifying based on how the respective one of the adjustment values modifies the visually altered output image; and
   said modifying the markup-language template to exclude, from the content-adaptive guided tutorial, instructions that would otherwise indicate how to interact with the image-editing control identified to exclude.

6. The method as recited in claim 1, wherein the generating the content-adaptive guided tutorial comprises:
   determining a presentation order for the image-editing controls based on a prioritization of the adjustment values; and ordering a presentation of the image-editing controls in the content-adaptive guided tutorial based on the presentation order.

7. The method as recited in claim 6, wherein the determining the presentation order for the image-editing controls comprises:
    computing an overall aesthetic score of the visually altered output image that is based on the adjustment values having been applied to the modifiable image parameters;
    determining, for each of the adjustment values, a respective contribution of each of the adjustment values to the overall aesthetic score;
    determining an adjustment value order, based on the respective contribution of each adjustment value, that places higher contributing adjustment values before lower contributing adjustment values; and
    positioning each of the image-editing controls to correspond with the adjustment value order of the adjustment values that correspond to the image-editing controls.

8. The method as recited in claim 1, wherein the generating the content-adaptive guided tutorial comprises integrating the content-adaptive guided tutorial with the image-editing application effective to present how to interact with the image-editing controls through the image-editing application to produce the visually altered output image.

9. The method as recited in claim 1, wherein the creating the rendition image comprises selecting an image resolution size for the rendition image based on an image quality level.

10. The method as recited in claim 1, further comprising:
    determining a rendition aesthetic score of the rendition image prior to the adjustment values being applied to the modifiable image parameters of the rendition image;
    determining an overall aesthetic score of the visually altered output image based on the adjustment values having been applied to the modifiable image parameters of the rendition image; and
    determining a quality level of the content-adaptive guided tutorial based on a comparison of the rendition aesthetic score and the overall aesthetic score.

11. A computing device implemented for generating an guided tutorial based on an input image, the computing device comprising:
    a memory to maintain the input image for input to an image-editing application that includes image-editing controls selectable to visually alter the input image;
    a processor system that implements a guided tutorial generation module of the image-editing application to:
        create a rendition image that replicates image parameters of the input image as modifiable image parameters of the rendition image;
        compute adjustment values for the modifiable image parameters to provide one or more visual alterations to the rendition image, each of the image-editing controls being associated with a respective adjustment value of the adjustment values;
        identifying an image-editing control of the image-editing controls to exclude from the content-adaptive guided tutorial based on the respective adjustment value being visually non-productive; and
        generate the content-adaptive guided tutorial to indicate how to interact with the image-editing controls to change the image parameters based on the adjustment values and produce a visually altered output image based on the input image, the content-adaptive guided tutorial excluding instructions that would otherwise indicate how to interact with the image-editing control that is identified to exclude from the content-adaptive guided tutorial.

12. The computing device as recited in claim 11, wherein the guided tutorial generation module is implemented to:
    determine an effectiveness of the content-adaptive guided tutorial based on a quality level of the visually altered output image;
    determine to modify the content-adaptive guided tutorial based on the effectiveness of the content-adaptive guided tutorial; and
    modify the content-adaptive guided tutorial by at least one of different adjustment values being generated or different image-editing controls selected to include in the content-adaptive guided tutorial.

13. The computing device as recited in claim 12, wherein the guided tutorial generation module is implemented to evaluate a number of instructions used to produce the visually altered output image to determine the effectiveness of the content-adaptive guided tutorial.

14. The computing device as recited in claim 11, wherein the guided tutorial generation module is implemented to:
    access tutorial modules in a library of content-adaptive guided tutorial modules; and
    generate markup-language instructions that indicate a subset of content-adaptive guided tutorial modules in the library to include in the content-adaptive guided tutorial.

15. The computing device as recited in claim 11, wherein the guided tutorial generation module is implemented to:
    prioritize the image-editing controls; and
    order the image-editing controls in the content-adaptive guided tutorial to present higher priority image-editing controls before lower priority image-editing controls.

16. The computing device as recited in claim 11, wherein the guided tutorial generation module includes a machine-learning algorithm implemented to compute the adjustment values for the modifiable image parameters of the rendition image.

17. A computing device implemented for generating an editing tutorial associated with an editing application based on input content to the editing application, the computing device comprising:
    a memory to maintain the input content for input to the editing application that includes editing controls selectable to alter the input content;
    a processor system that implements the editing application to:
        create copy content of the input content, the copy content replicating a current state of content parameters of the input content as modifiable content parameters of the copy content;
        compute adjustment values for the modifiable content parameters that are selectable to initiate alterations to the copy content; and
        generate the editing tutorial to indicate how to interact with the editing controls to alter the content parameters based on the adjustment values to produce modified output content from the input content.

18. The computing device as recited in claim 17, wherein the input content comprises video content.

19. The computing device as recited in claim 17, wherein:
    the input content comprises digital data; and
    the editing application is implemented to create a version of the input content as the copy content that has less digital data than the input content.

20. The computing device as recited in claim 17, wherein the editing tutorial includes navigation instructions of how to access the editing controls to initiate modifications to the copy content.

* * * * *